(12) United States Patent
Furuya et al.

(10) Patent No.: US 9,786,921 B2
(45) Date of Patent: Oct. 10, 2017

(54) SECONDARY BATTERY, MANUFACTURING METHOD OF SECONDARY BATTERY, ELECTRODE FOR SECONDARY BATTERY, AND ELECTRONIC DEVICE

(71) Applicant: Sony Corporation, Tokyo (JP)

(72) Inventors: Tatsuya Furuya, Kanagawa (JP); Yuri Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 14/377,107

(22) PCT Filed: Nov. 16, 2012

(86) PCT No.: PCT/JP2012/079759
§ 371 (c)(1),
(2) Date: Aug. 6, 2014

(87) PCT Pub. No.: WO2013/121642
PCT Pub. Date: Aug. 22, 2013

(65) Prior Publication Data
US 2014/0377627 A1   Dec. 25, 2014

(30) Foreign Application Priority Data

Feb. 17, 2012 (JP) ................................. 2012-032279

(51) Int. Cl.
| | |
|---|---|
| *H01M 10/052* | (2010.01) |
| *H01M 4/78* | (2006.01) |
| *H01M 4/13* | (2010.01) |
| *H01M 10/0562* | (2010.01) |
| *H01M 4/36* | (2006.01) |

(Continued)

(52) U.S. Cl.
CPC .............. *H01M 4/78* (2013.01); *H01M 4/13* (2013.01); *H01M 4/366* (2013.01); *H01M 4/624* (2013.01); *H01M 10/0525* (2013.01); *H01M 10/0562* (2013.01); *H01M 2004/025* (2013.01); *H01M 2220/20* (2013.01); *H01M 2220/30* (2013.01); *Y02T 10/7011* (2013.01)

(58) Field of Classification Search
CPC ........................ H01M 10/0562; H01M 10/052
See application file for complete search history.

(56) References Cited

U.S. PATENT DOCUMENTS

| | | | |
|---|---|---|---|
| 2003/0108797 A1* | 6/2003 | Iijima | ............... H01M 10/0436 429/254 |
| 2008/0020283 A1* | 1/2008 | Miyashiro | .............. B82Y 30/00 429/322 |

FOREIGN PATENT DOCUMENTS

| | | |
|---|---|---|
| JP | 2002-373643 | 12/2002 |
| JP | 2003-059492 | 2/2003 |

(Continued)

OTHER PUBLICATIONS

International Search Report issued in connection with International Patent Application No. PCT/JP2012/079759, dated Dec. 18, 2012. (2 pages).

*Primary Examiner* — Olatunji Godo
(74) *Attorney, Agent, or Firm* — Chip Law Group

(57) ABSTRACT

There is provided a secondary battery including a positive electrode, a negative electrode, and a solid electrolyte layer disposed between the positive electrode and the negative electrode, wherein at least one of the positive electrode and the negative electrode contains a granular solid electrolyte and a granular conduction aid both bonded to a surface of a granular electrode active substance.

10 Claims, 19 Drawing Sheets

(51) Int. Cl.
*H01M 4/62* (2006.01)
*H01M 10/0525* (2010.01)
*H01M 4/02* (2006.01)

(56) References Cited

FOREIGN PATENT DOCUMENTS

| | | |
|---|---|---|
| JP | 2003-208897 | 7/2003 |
| JP | 2004-319129 | 11/2004 |
| JP | 2006-107963 | 4/2006 |
| JP | 2008-103284 | 5/2008 |
| JP | 2008-235227 | 10/2008 |
| JP | 2009-193940 | 8/2009 |
| JP | 2010-009773 | 1/2010 |
| JP | 2010-097811 | 4/2010 |
| JP | 2010-205024 | 9/2010 |
| JP | 2011-086610 | 4/2011 |
| WO | 2006/018921 | 2/2006 |

* cited by examiner

BEFORE SURFACE MODIFICATION

AFTER SURFACE MODIFICATION

BEFORE SURFACE MODIFICATION

AFTER SURFACE MODIFICATION

SECONDARY BATTERY, MANUFACTURING METHOD OF SECONDARY BATTERY, ELECTRODE FOR SECONDARY BATTERY, AND ELECTRONIC DEVICE

CROSS REFERENCES TO RELATED APPLICATIONS

The present application is a national stage of International Application No. PCT/JP2012/079759 filed on Nov. 16, 2012 and claims priority to Japanese Patent Application No. 2012-032279 filed on Feb. 17, 2012, the disclosure of which is incorporated herein by reference.

BACKGROUND

The present disclosure relates to a secondary battery, a manufacturing method of a secondary battery, an electrode for a secondary battery, and an electronic device. More particularly, the present disclosure relates to, for example, an electrode suitable for use in an all solid-state lithium (Li) ion battery and the like, and a manufacturing method thereof; a secondary battery such as a lithium ion battery using this electrode, and a manufacturing method thereof; and an electronic device using the secondary battery.

In recent years, an all solid-state lithium ion battery using a solid electrolyte which is a lithium ion conductor attracts attention, which acts as a secondary battery having a higher safety compared to an existing lithium ion battery using, as an electrolyte, a non-aqueous electrolyte in which a lithium salt is dissolved into an organic solvent. That is, the lithium ion conductor constituting the solid electrolyte is a single ion conductor in which only a lithium ion moves so that a side reaction and deterioration of an electrode accompanied thereby hardly take place compared to a secondary battery using a liquid electrolyte. Accordingly, the all solid-state lithium ion battery is a promising entry for a battery for an electric vehicle and a large-sized rechargeable battery.

In particular, the all solid-state lithium ion battery is expected to be preferably used as an in-vehicle higher output electric source because it is highly functional, highly reliable, highly risk-free without liquid spill, can obtain clean energy, is light-weighted, and can obtain higher energy density.

Among the all solid-state lithium ion battery, one of the most promising batteries in terms of practical realization is an oxide all solid-state lithium ion battery in which all of a positive electrode, a negative electrode and an electrolyte constituting the battery are constituted by a chemically stable oxide such as oxide ceramics.

As one of the methods of manufacturing the all solid-state lithium ion battery, a manufacturing method of laminating green compacts has been proposed (for example, see Patent Literature 1).

Although an oxide has excellent chemical stability, it has low ion conductivity on the other hand. Furthermore, an electron hardly passes through in a particle boundary between neighboring particles. For this reason, the oxide all solid-state lithium ion battery has had a problem that the impedance is large as a whole. It is generally known that among these problems to be solved, the ion conductivity can be improved by mixing a solid electrolyte in an electrode to generate an ion conduction path. However, when the solid electrolyte is mixed to the electrode too much, the ratio of an electrode active substance in the electrode decreases, and furthermore, the contact interface between the materials also increases. Accordingly, the electric resistance in the above particle boundary increases. Therefore, improvement in conductivity cannot be expected. In this manner, the improvement of ion conductivity and the decrease of the electric resistance in the particle boundary are in the relationship of trade-off. Therefore, there has been a limit in improving the ion conductivity and decreasing the impedance of the whole battery only by mixing the solid electrolyte. Therefore, the existing oxide all solid-state lithium ion battery has had a problem that a so-called rate property is low, in which the charge and discharge with a large electric current is difficult.

To address this concern, from the viewpoint of minimizing the influence of the above problems, a thin film oxide all solid-state lithium ion battery having a very thin electrode has been mainly proposed so far. However, when the electrode is thinner, the amount of the electrode active substance in the electrode is also naturally reduced. Accordingly, there is a limit in the rate properties that can be realized. Furthermore, there has been proposed that a sulfide having ion conductivity higher than an oxide is used as the solid electrolyte to improve the rate properties. However, a sulfide has a problem in chemical stability, and it could not be said that the charge-discharge cycle properties of the obtained all solid-state lithium ion battery are good. From the above, in the existing all solid-state lithium ion battery, the high rate properties and the favorable charge-discharge cycle properties were difficult to be mutually compatible (for example, see Patent Literature 2).

To address this concern, in order to reduce the above resistivity in the particle boundary, sintering at high temperature when manufacturing the oxide all solid-state lithium ion battery is generally performed. By performing the sintering, physical and electrical bonding properties between particles are improved, and an electron becomes likely to pass through the interface between the mutually neighboring particles. However, when the material undergoes this sintering process, it is subject to a change in substance and the like. Accordingly the chemical stability is impaired compared to before the sintering process. Thus, there has been a problem that deterioration in charge-discharge cycle properties due to use becomes larger (for example, see Patent Literatures 3 to 5).

CITATION LIST

Patent Literature

Patent Literature 1: JP 2008-103284A
Patent Literature 2: JP 2010-205024A
Patent Literature 3: JP 2011-86610A
Patent Literature 4: JP 2008-235227A
Patent Literature 5: JP 2010-97811A

SUMMARY

Technical Problem

Therefore, according to an embodiment of the present disclosure, there is provided a secondary battery having higher rate properties compared to before.

Another problem to be solved by the present disclosure is to provide a manufacturing method of a secondary battery that has higher rate properties than before and that can be manufactured without undergoing a firing process.

A further another problem to be solved by the present disclosure is to provide a secondary battery having a low impedance in the whole electrode.

A further another problem to be solved by the present disclosure is to provide a high performance electronic device using the above excellent secondary battery.

Solution to Problem

In order to solve the above problems, the present disclosure is a secondary battery including:
a positive electrode;
a negative electrode; and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

Further, the present disclosure is a manufacturing method of a secondary battery, including the steps of:
forming at least one of a positive electrode and a negative electrode, using a plurality of electrode particles each including a granular solid electrolyte and a granular conduction aid both bonded on a surface of a granular electrode active substance; and
laminating the positive electrode and the negative electrode with a solid electrolyte layer interposed therebetween.

Further, the present disclosure is an electrode for a secondary battery,
wherein a granular solid electrolyte and a granular conduction aid are bonded to a surface of a granular electrode active substance.

Further, the present disclosure is an electronic device having a secondary battery, the secondary battery including:
a positive electrode;
a negative electrode; and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

Also, the present disclosure is a battery pack including:
a secondary battery;
a control device configured to perform control regarding the secondary battery; and
a package configured to contain the secondary battery therein,
wherein the secondary battery has
a positive electrode,
a negative electrode, and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

In this battery package, the control means performs control of charge and discharge, overdischarge and overcharge with respect to the secondary battery.

Also, the present disclosure is an electric vehicle including:
a conversion device configured to be supplied with power from a secondary battery to convert the power into a driving force of the vehicle; and
a control device configured to perform information processing regarding vehicle control based on information regarding the secondary battery,
wherein the secondary battery has
a positive electrode,
a negative electrode, and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

In this electric vehicle, the conversion device typically generates a driving force after receiving, from the secondary battery, power supply for rotating a motor. This motor can utilize also regenerative energy. The control device performs information processing with respect to vehicle control based on the remaining battery level of the secondary battery. This electric vehicle includes an electric car, an electric motorcycle, an electric cart, an electric bicycle and a railroad vehicle, and further includes a so-called hybrid vehicle.

Also, the present disclosure is an electric power system configured to be supplied with power from a secondary battery, and/or to supply power from a power source to the secondary battery,
wherein the secondary battery has
a positive electrode,
a negative electrode, and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

The electric power system may be any one so long as electric power is used, and includes a simple electric power apparatus. This electric power system includes, for example, a smart grid, a home energy management system (HEMS) and a vehicle, and enables electric storage.

Also, the present disclosure is a power source for power storage, wherein the power source:
is configured to be connected to an electronic device to be supplied with power; and
includes a secondary battery,
wherein the secondary battery has
a positive electrode,
a negative electrode, and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

The usage of this power source for power storage is not considered, and can be basically used in any power supply system or power supply apparatus, for example, in a smart grid.

In the present disclosure, the solid electrolyte may be basically any solid electrolyte as long as it has ion conductivity, and is selected depending on necessity. This solid electrolyte is preferably a substance that is solid at normal temperature, and also preferably has lithium ion conductivity. The solid electrolyte contains, for example, at least one selected from the group consisting of an oxide, a phosphoric acid-based compound, a germanic acid-based compound, a sulfide, and a nitride. Specifically, the solid electrolyte include at least one selected from the group consisting of, for example, $La_{2/3-x}Li_{3x}TiO_3$ ($0<x<2/3$), $La_{0.5}Li_{0.5}TiO_3$, $Li_{4+x}M_xSi_{1-x}O_4$ (M=B, Al), $Li_7La_3Zr_2O_{12}$, $Li_9SiAlO_3$, $Li_5La_3Ta_2O_{12}$, $Li_5La_3Nb_2O_{12}$, $Li_6BaLa_2Ta_2O_{12}$, $Li_{3.6}Si_{0.6}P_{0.4}O_4$, $LiZr_2(PO_4)_3$, $Li_{1+x}Al_xTi_{2-x}(PO_4)_3$, $Li_{14}Zn(GeO_4)_4$, $Li_{3.25}Ge_{0.25}P_{0.75}S_4$, $Li_{10}GeP_2S_{12}$ and $Li_3N$, but not limited to the above.

The shape of the solid electrolyte may be basically any shape. Specific examples of the shape include preferably a cube, a rectangular parallelepiped, a polyhedron, a sphere, an oval sphere, a cylinder, a frustum, a plate and a needle. Among the above shapes, it is particularly preferred to be a spherical particle. However, the shape is not restricted to the above shapes. Furthermore, the solid electrolyte may be, for example, a solid body, a hollow body and a multi-layered body.

The electrode active substance may be any substance as long as it is a substance capable of transferring an electron, and is selected depending on necessity. This electrode active substance is preferably a substance that is solid at normal temperature, and is also more preferably a crystalline substance. Also, an example of the electrode active substance is preferably a substance containing at least one selected from the group of C, Li, Mg, Mn, Fe, Co, Ni, B, Al, Ti, Si, Ge, Sn, Bi, and W, and specifically includes a simple substance, a compound and an alloy. An example of the substance containing the above elements includes a compound such as an oxide, a sulfide, a nitride, a phosphate, a borate and a silicate. An example of the substance containing the above elements includes an alloy such as a binary alloy and a ternary alloy of a metal containing the above elements. Also, a positive electrode active substance and a negative electrode active substance are appropriately selected from the substances described above as the electrode active substance, in view of the normal electrode potential difference. As the positive electrode active substance, for example, a substance having a high oxidizing power is suitably selected among the electrode active substances. Examples of the substance having a high oxidizing power include a lithium compound and a chalcogenide. Examples of the lithium compound include nickel-cobalt-lithium manganate ($LiNi_xCo_{1-x-y}Mn_yO_2$, lithium cobaltate ($LiCoO_2$), lithium nickelate ($LiNiO_2$), lithium manganate ($LiMn_2O_4$), lithium titanate ($Li_4Ti_5O_{12}$), iron olivine ($LiFePO_4$), cobalt olivine ($Li_4CoPO_4$) and manganese olivine ($LiMnPO_4$). Also, examples of the chalcogenide include copper chevrel ($Cu_2Mo_6S_8$), iron sulfide (FeS), cobalt sulfide (CoS) and nickel sulfide (NiS). Also, as the negative electrode active substance, a substance that has strong reducing power and that can occlude and discharge a metal ion is suitably selected. A specific example of the negative electrode active substance is preferably a substance containing at least one selected from alkali metal, a Group 2 element, a Group 13 element and a transition metal element, and specifically includes a simple substance, a compound and an alloy. Here, examples of the alkali metal include lithium (Li), sodium (Na) and potassium (K). Also, examples of the Group 2 element include magnesium and calcium. Also, examples of the Group 13 element include aluminum (Al) and gallium (Ga). Also, examples of the transition element include iron (Fe), copper (Cu) and nickel (Ni). Also, examples of the compound containing the above elements include a metal oxide, a metal nitride and a metal sulfide. Among the above described, at least one selected from a carbon material as well as a simple substance, a compound and an alloy containing a lithium element is preferred. Here, examples of the carbon material include graphite, graphene and activated carbon. Also, an example of the lithium simple substance includes metal lithium. Also, examples of the lithium compound include the substances described above as the positive electrode active substance. Also, examples of the lithium alloy include a Li—Al alloy, a Li—Al—Ni alloy, a Li—Ni—Sn alloy, a Li—Al—V alloy, a Li—Al—Cr alloy and a Li—In alloy. However, the electrode active substance, the positive electrode active substance and the negative electrode active substance are not restricted to the above described.

The shape of the electrode active substance may be basically any shape as long as it is granular. Specifically, for example, it is preferred to have shapes similar to the shapes described in the solid electrolyte. Also, among the shapes described above, it is more preferred to have a sphere shape. Also, examples of the electrode active substance may include a solid body, a hollow body, and a multi-layered body, but not restricted to these shapes. Also, the electrode active substance in the electrode may have all the same shape, or may have different shapes in combination. The shapes described above can be appropriately selected.

The size of the electrode active substance may be basically any size, and appropriately selected according to the shapes described above. However, as a specific size, the average particle size of the primary particles is, for example, preferably greater than or equal to 1 μm and less than or equal to 100 μm, more preferably greater than or equal to 3 μm and less than or equal to 50 μm, and most preferably greater than or equal to 5 μm and less than or equal to 20 μm, but not restricted to the above. Also, the electrode active substances in the electrode may have all the same size, or may have different sizes in combination. The sizes described above can be appropriately selected. However, it is preferred that a plurality of the electrode active substances having different sizes is combined in order to reduce the voids in the electrode.

The conduction aid may be basically any conduction aid as long as it has a conductive material having electrical conductivity, and is appropriately selected depending on necessity. This conduction aid is preferably a substance that is solid at normal temperature. The conduction aid specifically includes, for example, at least one selected from the group consisting of metal, carbon and a conductive polymer. Examples of the metal include a metal simple substance and an alloy. Examples of the metal simple substance include silver (Ag), copper (Cu), gold (Au), aluminum (Al), magnesium (Mg), tungsten (W), cobalt (Co), zinc (Zn), nickel (Ni), potassium (K), lithium (Li), iron (Fe), platinum (Pt), tin (Sn), chromium (Cr), titanium (Ti) and mercury (Hg). An example of the alloy include a multi-component alloy that is a combination of at least two or more selected from the group consisting of the above metal simple substances. Specific examples thereof include aluminum alloy, titanium alloy, stainless steel, brass, bronze, nickel silver, cupronickel, manganin and nichrome. Examples of other metal include tin oxide doped with fluorine, antimony oxide doped with fluorine, indium tin oxide doped with fluorine, indium gallium zinc oxide doped with fluorine, and potassium titanate doped with fluorine. Also, an example of carbon includes conductive carbon. Specific examples thereof include carbon black, graphite, black lead, amorphous carbon (glass-like carbon), diamond-like carbon, activated carbon, petroleum coke, fullerenes such as $C_{60}$ and $C_{70}$, and a carbon nanotube having a single layer or multiple layers. Among these, particularly, examples of the carbon black include Ketjen black, thermal black, lamp black and furnace black. Also, examples of the conductive polymer include polyaniline, polypyrrole and polythiophene, but not restricted to the conductive materials described above. Also, the conduction aid preferably includes at least one selected from the group of the conductive materials described above, and more preferably includes only one selected from the group of the conductive materials described above. Also, the conduction aid may be a combination of at least one selected from the group of the conductive materials described above and an insulating material, and may be specifically configured by, for example, laminating the conductive materials described above to an insulating material. This may be, for example, a particle in which the surface of an inorganic material such as a glass bead and a zirconia bead is coated with the conductive material. However, the conductive material and the conduction aid are not restricted to the above described.

The shape of the conduction aid may be basically any shape as long as it is granular, and appropriately determined depending on necessity. Specific examples of this shape include a cube, a rectangular parallelepiped, a polyhedron, a sphere, an oval sphere, a cylinder, a frustum, a plate and a needle. Among the shapes described above, it is particularly preferred to be a spherical particle, but not restricted to the shapes described above. Furthermore, the solid electrolyte may be a solid body, a hollow body and a multi-layered body.

At least one of the positive electrode and the negative electrode is formed by, for example, an aggregate of electrode particles. Each of the electrode particles is, for example, configured such that a granular solid electrolyte and a granular conduction aid are bonded to a surface of an electrode active substance.

The electrode particle is preferably, for example, configured such that a mixed conductive layer including a mixture of a granular solid electrolyte and a granular conduction aid is disposed to the surface of the electrode active substance. Also, the electrode particle is preferably, for example, configured such that at least a portion of the granular solid electrolyte and the granular conduction aid contained in the mixed conductive layer is bonded to the surface of the electrode active substance. Also, the electrode particle is preferably, for example, configured such that the granular solid electrolyte and the granular conduction aid form a continuous film on at least a portion of the surface of the electrode active substance. The continuous film is preferably configured such that the granular solid electrolyte and the granular conduction aid constituting the continuous film are the granular solid electrolyte and the granular conduction aid contained in the mixed conductive layer. Also, the electrode particles, for example, preferably cover at least a portion of the surface of the electrode active substance, and preferably substantially cover the whole of the surface of the electrode active substance; but not restricted to the above described.

The aggregate of the electrode particles may basically have any form as long as at least some electrode particles of the mutually neighboring electrode particles aggregate so as to come into contact with each other. However, it is preferred that all of the mutually neighboring electrode particles aggregate so as to come into contact with each other. Also, the aggregate of the electrode particles preferably aggregates such that at least some of the mixed conductive layers constituting the electrode particles come into contact with each other, but not restricted to the above.

Advantageous Effects of Invention

According to the present disclosure, there can be obtained an electrode for a secondary battery having a low impedance of the whole electrode. By using such an excellent electrode, there can be obtained a high performance secondary battery having higher rate properties than before.

Additional features and advantages are described herein, and will be apparent from the following Detailed Description and the figures.

DETAILED DESCRIPTION

For solving the above problems, the present disclosers conducted extensive studies.

Figure 19:
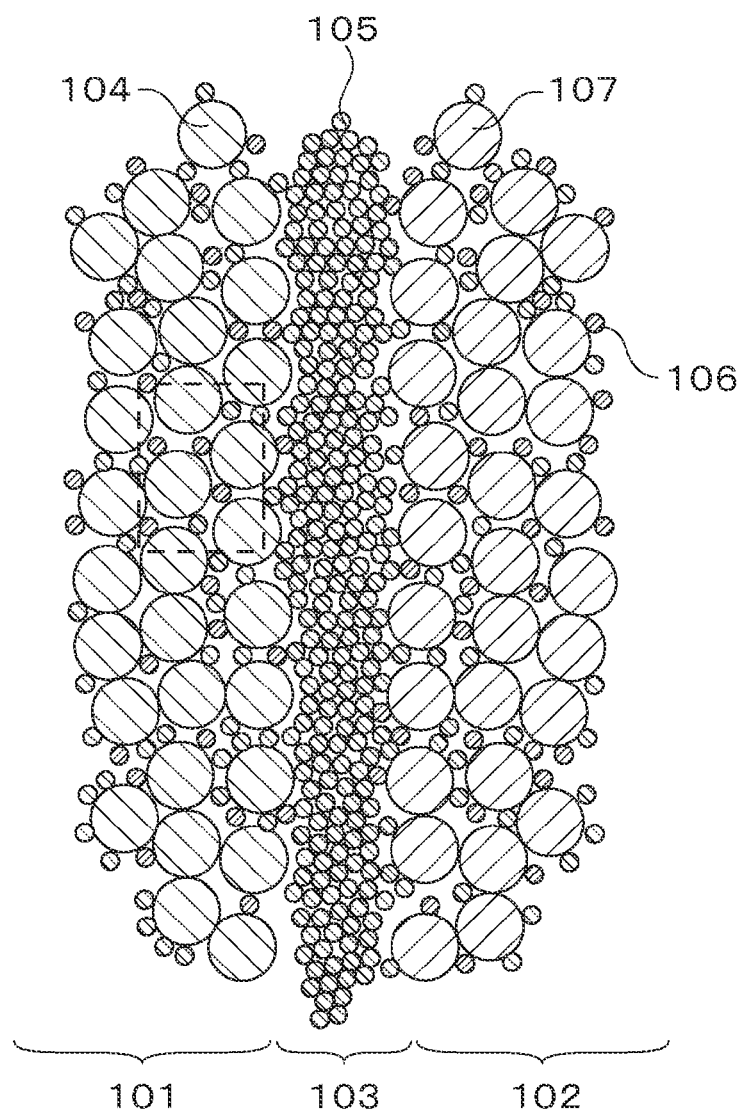
FIG. 19 is a cross-sectional view illustrating the all solid-state type lithium ion battery reviewed by the present disclosers.

FIG. 19 illustrates the all solid-state type lithium ion battery reviewed by the present disclosers.

As illustrated in FIG. 19, this all solid-state type lithium ion battery 100 has a structure in which a positive electrode 101 and a negative electrode 102 face each other through a solid electrolyte layer 103.

The positive electrode 101 includes a plurality of granular positive electrode active substances 104 as an electrode active substance, a plurality of granular solid electrolytes 105, and a plurality of granular conduction aids 106. The negative electrode 102 includes a plurality of granular negative electrode active substances 107, the plurality of granular solid electrolytes 105, and the plurality of granular conduction aids 106. The solid electrolyte layer 103 includes the plurality of granular solid electrolytes 105. The positive electrode 101 and the negative electrode 102 are manufactured by particle-compacting a mixture prepared by precisely mixing the above materials.

The present disclosers charged the all solid-state type lithium ion battery 100 using a potentiostat, and measured the discharge voltage. However, a result better than the existing all solid-state type lithium ion battery could not be obtained. Then, the present disclosers considered that the reason why the performance of the all solid-state type lithium ion battery 100 was not improved resides in the structures of the positive electrode 101 and the negative electrode 102. The outline thereof will be indicated below.

Figure 20:
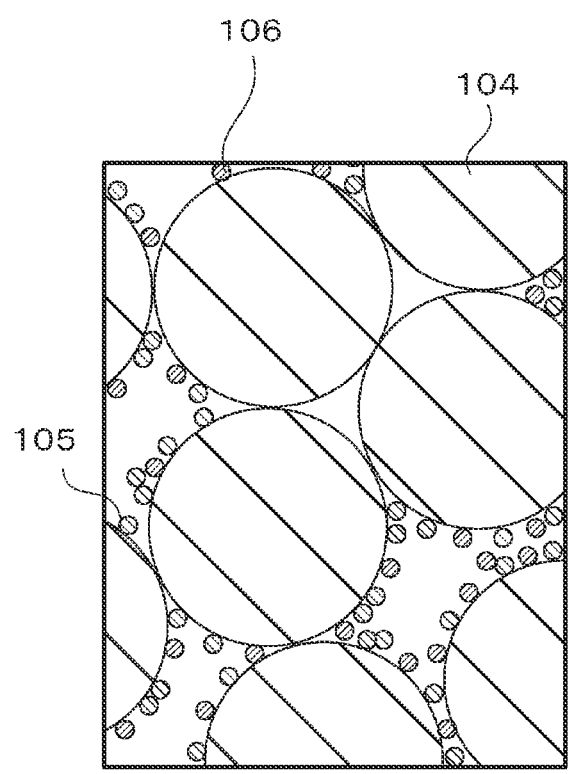
FIG. 20 is an enlarged view of a portion surrounded by a dashed line of the electrode of the all solid-state type lithium ion battery reviewed by the present disclosers.

FIG. 20 is an enlarged view of a portion of the positive electrode 101 of the all solid-state type lithium ion battery 100.

As illustrated in FIG. 20, the positive electrode 101 has the granular solid electrolytes 105 and the granular conduction aids 106 in at least a portion of the space between mutually neighboring granular positive electrode active substances 104. Some of the solid electrolytes 105 and the conduction aids 106 adsorb to the surfaces of the positive electrode active substances 104.

The structural problems of this positive electrode 101 firstly include that the ratio of the solid electrolytes 105 and the conduction aids 106 adsorbing to the surface of the positive electrode active substances 104 with respect to the positive electrode active substances 104 is very low. This firstly causes a problem that ions and electrons transferring from the positive electrode active substances 104 cannot be effectively utilized. This is because since the solid electrolytes 105 serve as an ion conduction path, and the conduction aids 106 serve as an electron conduction path, ions and electrons from the positive electrode active substances 104 cannot be effectively transferred to the outside. Furthermore, this also causes a problem that the battery performance with respect to the volume of the positive electrode 101 is lowered. This is because many interstices come to exist among the particles constituting the inside of the positive electrode 101.

Also, the problems secondly include that the impedance in the particle boundary between the positive electrode active substance 104, and the solid electrolyte 105 or the conduction aid 106 that adsorbs to the surface of the positive electrode active substance 104 is extremely high. Especially, since the bond in the particle boundary is a bond only by the interparticle force such as an electrostatic force, the physical and electrical bonding forces are extremely weak. For example, when a certain force is newly added to this bond, the adsorption due to this bond is easily released. For solving this problem, a process for improving bonding properties, such as sintering, becomes necessary. However, the firing process generates a new problem that a side reaction occurs to significantly damage the electrochemical properties of the positive electrode active substance 104.

Furthermore, the problems thirdly include that the precise mixing causes only the positive electrode active substances 104 to aggregate each other so that the positive electrode active substances 104 form a secondary particle. Accordingly, the apparent surface area of the positive electrode active substances 104 is significantly reduced, so that the surface area of the positive electrode active substances 104 that can be brought into contact with the solid electrolytes 105 and the conduction aids 106 comes to be significantly reduced. This further complicates the above problem that ions and electrons transferring from the positive electrode active substances 104 cannot be effectively utilized.

In addition, the problems fourthly include that the physical and electrical bonding properties in the contact surface between the positive electrode 101 and the solid electrolyte layer 103 are low. In a majority of this contact surface, the bonding properties of the positive electrode active substances 104 and the solid electrolyte layer 103 both being in direct contact with each other is low, and furthermore, the difference in the particle size generates many interstices in this contact interface. Therefore, only laminating the both and only performing a particle-compacting process to the both cause connection between the positive electrode 101 and the solid electrolyte layer 103 to be insufficient. Thus, the impedance in the contact interface between the positive electrode 101 and the solid electrolyte layer 103 is high.

Also, these problems are considered to similarly exist in the negative electrode 102 having the negative electrode active substances 107 as the active substance as well as in the contact interface between the negative electrode 102 and the solid electrolyte layer 103.

For solving these newly raised problems, the present disclosers further performed studies. As a result, the present disclosers found that when the electrode of a lithium ion battery is constituted by an aggregate of the electrode particles each containing a granular electrode active substance coated with the mixed conductive layer, the conductivity of the electrode dramatically improves, and worked out the present technology.

Hereinafter, a mode for carrying out the invention (hereinafter, referred to as an "embodiment") will be described. Here, the description will be performed in the order below.
1. First Embodiment (Electrode for lithium ion battery and manufacturing method thereof)
2. Second Embodiment (Electrode for lithium ion battery and manufacturing method thereof)
3. Third Embodiment (Lithium ion battery and manufacturing method thereof)
4. Fourth Embodiment (Lithium ion battery and manufacturing method thereof)

1. First Embodiment

[Electrode for Lithium Ion Battery]

Figure 1A:
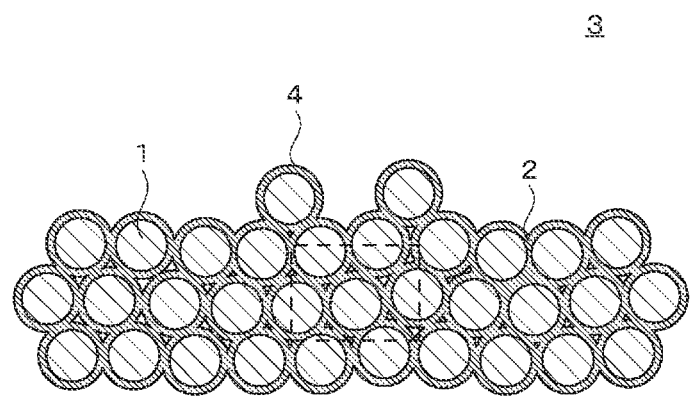
FIG. 1A and FIG. 1B are a cross-sectional view illustrating the positive electrode for a lithium ion battery according to the first embodiment and a cross-sectional view illustrating the negative electrode for a lithium ion battery according to the first embodiment respectively.
Figure 1B:
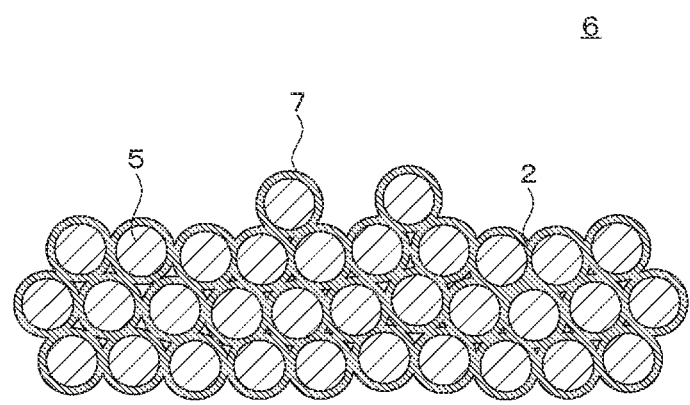

FIG. 1 is a cross-sectional view illustrating the electrode for a lithium ion battery according to the first embodiment. Here, FIG. 1A is a positive electrode for a lithium ion battery, and FIG. 1B is a negative electrode for a lithium ion battery.

As illustrated in FIG. 1A, a positive electrode 3 for a lithium ion battery (hereinafter, referred to as a positive electrode 3) is constituted by an aggregate of positive electrode particles 4 each containing a positive electrode active substance 1 as a granular electrode active substance coated with a mixed conductive layer 2.

Also, as illustrated in FIG. 1B, a negative electrode 6 for a lithium ion battery (hereinafter referred to as a negative electrode 6) includes an aggregate of negative electrode particles 7 each containing a negative electrode active substance 5, in place of the positive electrode active substance 1, as a granular electrode active substance. The negative electrode active substance 5 is coated with a mixed conductive layer 2.

The thickness of the positive electrode 3 is specifically, for example, but not particularly restricted to, preferably greater than or equal to 10 µm and less than or equal to 1000 µm, particularly preferably greater than or equal to 10 µm and less than or equal to 500 µm, and most preferably greater than or equal to 10 µm and less than or equal to 100 µm.

Figure 2:
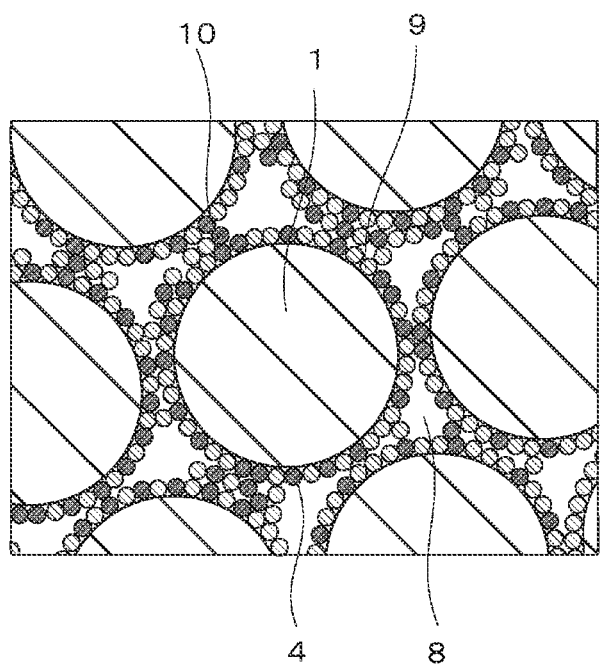
FIG. 2 is an enlarged view of a portion surrounded by a dashed line of the positive electrode for a lithium ion battery according to the first embodiment.

FIG. 2 illustrates an enlarged view of a portion surrounded by a dashed line of the positive electrode 3 in FIG. 1A.

As illustrated in FIG. 1A and FIG. 2, the mixed conductive layer 2 has a granular solid electrolyte 9 and a granular conduction aid 10. The solid electrolyte 9 and the conduction aid 10 are provided so as to cover the surface of the positive electrode active substance 1 to constitute the positive particle 4. The positive electrode 3 has a plurality of the positive electrode particles 4, and the positive electrode particles 4 are in contact with each other to form an aggregate. The mixed conductive layers 2 each constituting each of the mutually neighboring positive electrode particles 4 are in contact with each other. That is, the positive electrode active substances 1 constituting the mutually neighboring positive electrode particles 4 are separated from each other. Also, in a case such as when the coating thickness of the mixed conductive layer 2 in the positive particle 4 is quite small with respect to the particle size of the positive electrode active substance 1, there exists a void 8 between the mutually neighboring positive electrode particles 4.

The ratio of the positive electrode active substance 1 to the positive electrode 3 is basically not restricted. However, in terms of a weight ratio, for example, the weight of the positive electrode active substance 1 to the weight of the positive electrode 3 is preferably greater than or equal to 70% and less than 94%, more preferably greater than or equal to 75% and less than 94%, and most preferably greater than or equal to 80% and less than 94%.

The ratio of the mixed conductive layer 2 to the positive electrode 3 is basically not restricted. However, in terms of a weight ratio, for example, the weight of the mixed conductive layer 2 to the weight of the positive electrode 3 is preferably greater than or equal to 3% and less than or equal to 30%, more preferably greater than or equal to 3% and less than or equal to 25%, and most preferably greater than or equal to 3% and less than or equal to 20%. This is because at less than or equal to 6%, one of the ion conductivity and the electrical conductivity significantly decreases.

The solid electrolyte 9 and the conduction aid 10 contained in the mixed conductive layer 2 may be appropriately selected from the above described as the solid electrolyte and the conduction aid, but not restricted to the above.

The ratio of the solid electrolyte 9 to the positive electrode 3 is basically not restricted, and appropriately selected depending on necessity. However, in terms of a weight ratio, for example, the weight of the solid electrolyte 9 contained in the positive electrode 3 with respect to the whole positive electrode 3 is preferably greater than or equal to 3% and less than or equal to 15%, more preferably greater than or equal to 3% and less than or equal to 10%, and most preferably greater than or equal to 3% and less than or equal to 5%.

The size of the solid electrolyte 9 may be basically any size, and appropriately determined depending on necessity. However, in the positive electrode 3, it is preferred to be clearly smaller than the size of the positive electrode active substance 1. As a specific example of the ratio in size between the positive electrode active substance 1 and the solid electrolyte 9, a proportion of the average particle size of the primary particles of the solid electrolyte 9 to the average particle size of the primary particles of the positive electrode active substance 1 is preferably less than or equal to $1/10$, more preferably less than or equal to $1/50$, and most preferably less than or equal to $1/100$. Also, the size of the solid electrolyte 9 is preferably greater than or equal to $1/1000$ of the average particle size of the primary particles of the positive electrode active substance 1. Also, as an example of the specific size of the solid electrolyte 9, the average particle size of the primary particles is preferably greater than or equal to 5 nm and less than or equal to 10 µm, more preferably greater than or equal to 5 nm and less than or equal to 1 µm, and most preferably greater than or equal to 5 nm and less than or equal to 100 nm; but not restricted to the ratios in size and the particle sizes described above.

The ratio of the conduction aid 10 to the positive electrode 3 is basically not restricted, and appropriately selected depending on necessity. However, in terms of a weight ratio, for example, the weight of the conduction aid 10 contained in the positive electrode 3 with respect to the weight of the whole positive electrode 3 is preferably greater than or equal to 3% and less than or equal to 15%, more preferably greater than or equal to 3% and less than or equal to 10%, and most preferably greater than or equal to 3% and less than or equal to 5%.

The size of the conduction aid 10 may be basically any size, and appropriately determined depending on necessity. However, it is preferred to be clearly smaller than the size of the positive electrode active substance 1. As a specific example of the ratio in size between the positive electrode active substance 1 and the conduction aid 10, a proportion of the average particle size of the primary particles of the conduction aid 10 to the average particle size of the primary particles of the electrode active substance is preferably less than or equal to 1/10, more preferably less than or equal to 1/50, and most preferably less than or equal to 1/100. Also, the size of the conduction aid 10 is preferably greater than or equal to 1/1000 of the average particle size of the primary particles of the positive electrode active substance 1. Also, as an example of the specific size of the conduction aid 10, the average particle size of the primary particles is preferably greater than or equal to 5 nm and less than or equal to 200 nm, more preferably greater than or equal to 5 nm and less than or equal to 100 µm, and most preferably greater than or equal to 5 nm and less than or equal to 30 nm; but not restricted to the ratios in size and the particle sizes described above.

Also, as the ratio between the solid electrolyte 9 and the conduction aid 10 contained in the mixed conductive layer 2, in terms of a weight ratio, for example, the weight of the solid electrolyte 9 with respect to the weight of the conduction aid 10 is preferably greater than or equal to 1 time and less than or equal to 10 times, more preferably greater than or equal to 3 times and less than or equal to 7 times, and most preferably greater than or equal to 4 times and less than or equal to 5 times; but not restricted to the above.

In the positive electrode particle 4, the mixed conductive layer 2 preferably covers at least a portion of the surface of the positive electrode active substance 1; and the mixed conductive layer 2 most preferably covers substantially the entire surface of the positive electrode active substance 1. A specific example of the coverage of the mixed conductive layer 2 includes preferably greater than or equal to 90% of the surface of the positive electrode active substance 1, more preferably greater than or equal to 95% of the surface of the positive electrode active substance 1, and most preferably greater than or equal to 99% of the surface of the positive electrode active substance 1; but not restricted to the above.

The size of the positive electrode particle 4 may be basically any size, and appropriately selected according to the shapes described above. However, as a specific size, the average particle size of the primary particles is, for example, preferably greater than or equal to 2 µm and less than or equal to 110 µm, more preferably greater than or equal to 2 µm and less than or equal to 60 µm, and most preferably greater than or equal to 2 µm and less than or equal to 30 µm; but not restricted to the above.

The ratio of the solid electrolyte 9 to the positive electrode 4 is basically not restricted, and appropriately selected depending on necessity. However, in terms of a weight ratio, for example, the weight of the solid electrolyte 9 contained in the positive electrode particle 4 is preferably greater than or equal to 3% and less than or equal to 15%, more preferably greater than or equal to 3% and less than or equal to 10%, and most preferably greater than or equal to 3% and less than or equal to 5%, of the weight of the whole positive electrode particle 4.

The ratio of the conduction aid 10 to the positive electrode particle 4 is basically not restricted, and appropriately selected depending on necessity. However, in terms of a weight ratio, for example, the weight of the conduction aid 10 contained in the positive electrode particle 4 is preferably greater than or equal to 3% and less than or equal to 20%, more preferably greater than or equal to 3% and less than or equal to 15%, and most preferably greater than or equal to 3% and less than or equal to 10%, of the weight of the whole positive electrode particle 4.

The aggregate of the positive electrode particles 4 may be either an aggregate with the positive electrode particles 4 constituted by the same material, or an aggregate with a combination of the positive electrode particles 4 constituted by different materials, and is constituted by appropriately selecting a material from the above positive electrode active substances, solid electrolytes and conduction aids. Among these, the aggregate preferably has a structure in which all of the positive electrode particles 4 constituting the aggregate are constituted with the same material, but not restricted to the above.

The aggregate of the positive electrode particles 4 may be either an aggregate with the positive electrode particles 4 having the same size, or an aggregate with a combination of the positive electrode particles 4 having different sizes, and is constituted by appropriately selecting a size from the above sizes and particle sizes. Among these, the size is preferably appropriately selected from the above sizes and particle sizes so that a void does not exist inside the positive electrode 3, but not restricted to the above.

Also, although the formation of the aggregate with the positive electrode particles 4 causes the void 8 to be generated in a portion of the inside of the mixed conductive layer 2 in some cases, it is preferred that the volume of the void 8 is small. Specifically, for example, the void rate with respect to the volume of the whole positive electrode 3 is preferably less than or equal to 20%, preferably less than or equal to 10%, and most preferably less than or equal to 5%; but not restricted to the above. Also, the void 8 does not include a pore or the like present on, for example, the surfaces of the solid electrolyte 9 and the conduction aid 10 constituting the mixed conductive layer 2.

Also, the above regarding the positive electrode 3 similarly applies to the negative electrode 6, by substituting the positive electrode 3 with the negative electrode 6, the positive electrode particle 4 with the negative electrode particle 7, and the positive electrode active substance 1 that is an electrode active substance in the positive electrode 3 with the negative electrode active substance 5. Here, the negative electrode active substance 5 can be appropriately selected from the above described as the electrode active substance. Also, the solid electrolyte 9 and the conduction aid 10 contained in the negative electrode 6 may be the same as or different from those contained in the positive electrode 3, but not restricted to the above described.

According to the electrode for a lithium ion battery of the first embodiment, the electrode is constituted by the aggregate of the electrode particles each including the granular electrode active substance coated with the mixed conductive layer 2. Therefore, an increase of impedance in the electrode caused by aggregation with only the electrode active substances can be suppressed. Also, since the mixed conductive layer 2 includes the solid electrolyte 9 and the conduction aid 10, the solid electrolyte 9 becomes an ion conduction path, and the conduction aid 10 becomes an electron conduction path. Accordingly, the impedance in the electrode can be lowered. Also, since the electrode particles aggregate in a mutually neighboring manner to constitute the electrode, the mutually neighboring electrode active substances are disposed so as to be brought into contact with each other through the mixed conductive layer 2. Accordingly, an ion conduction path and an electron conduction path are disposed between the mutually neighboring electrode active substances. This also enables the impedance in the whole electrode to be lowered, thereby to improve the conductivity of the electrode.

[Manufacturing Method of Electrode for Lithium Ion Battery]

The electrode for a lithium ion battery can be, for example, manufactured as below.

First, the manufacturing method of the positive electrode 3 will be described.

FIG. 3A, FIG. 3B, FIG. 3C, FIG. 3D and FIG. 4 are cross-sectional views illustrating the manufacturing process of the positive electrode 3.

Figure 3A:
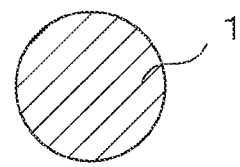
FIG. 3A, FIG. 3B, FIG. 3C and FIG. 3D are a cross-sectional view illustrating the manufacturing method of the positive electrode for a lithium ion battery according to the first embodiment, a cross-sectional view illustrating the manufacturing method of the positive electrode for a lithium ion battery according to the first embodiment, a cross-sectional view illustrating the manufacturing method of the positive electrode for a lithium ion battery according to the first embodiment, and a cross-sectional view illustrating the manufacturing method of the positive electrode for a lithium ion battery according to the first embodiment respectively.
Figure 3B:
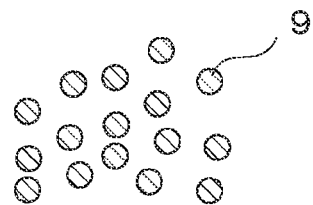
Figure 3C:
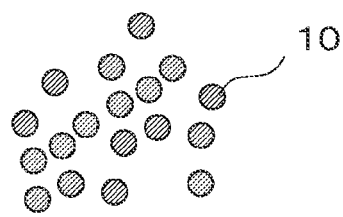

As illustrated in FIG. 3A, FIG. 3B and FIG. 3C, firstly, a particle of the positive electrode active substance 1, particles of the solid electrolyte 9 and particles of the conduction aid 10 are provided as the materials constituting the positive electrode 3.

The material constituting the positive electrode active substance 1 is basically not restricted, and can be appropriately selected from the above described as the electrode active substance. Among those, in particular, the positive electrode active substance 1 is preferably made of a material that is a solid particle at normal temperature, and furthermore, more preferably made of a dry particle; but not restricted to the above described.

The shape of the positive electrode active substance 1 is basically any shape as long as it is granular, and can be appropriately selected from the shapes described above as the electrode active substance depending on necessity. However, among the above described, it is preferred to be a spherical particle.

The material constituting the solid electrolyte 9 is basically not restricted, and can be appropriately selected from the above described as the solid electrolyte. Among those, in particular, it is preferred to include a material that is a solid particle at normal temperature. Furthermore, the solid electrolyte 9 is preferably a dry particle, but not restricted to the above.

The shape of the solid electrolyte 9 is basically any shape as long as it is granular, and can be appropriately selected from the shapes described above as the solid electrolyte depending on necessity. However, among the above described, it is preferred to be a spherical particle.

The material constituting the conduction aid 10 is basically not restricted, and can be appropriately selected from the above described as the conduction aid. Among those, in particular, it is preferred to include a material that is a solid particle at normal temperature. Furthermore, the solid electrolyte 9 is preferably a dry particle, but not restricted to the above.

The shape of the conduction aid 10 is basically any shape as long as it is granular, and can be appropriately selected from the shapes described above as the conduction aid depending on necessity. However, among the above described, it is preferred to be a spherical particle.

Figure 3D:
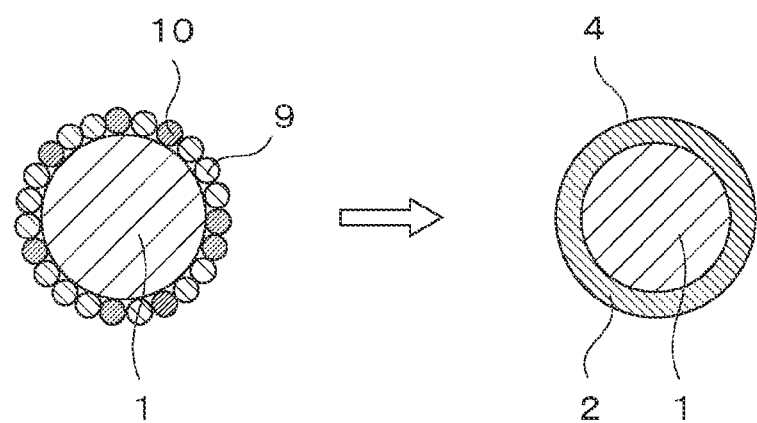

Next, as illustrated in FIG. 3D, the particle of the positive electrode active substance 1, the particles of the solid electrolyte 9 and the particles of the conduction aid 10 were mixed together and further subjected to coating processing, thereby to allow the solid electrolyte 9 and the conduction aid 10 to bond to the surface of the positive electrode active substance 1. Accordingly, the mixed conductive layer 2 was formed on the surface of the positive electrode active substance 1. Thus, the positive electrode particle 4 was obtained in which the surface of the positive electrode active substance 1 was coated with the mixed conductive layer 2. In this case, the particle of the positive electrode active substance 1, the particles of the solid electrolyte 9 and the particles of the conduction aid 10 may be previously mixed to prepare a mixture and then subjected to coating processing, or may be sequentially added and subjected to coating processing.

Although the mixed conductive layer 2 constituting the positive electrode particle 4 is constituted such that at least one of the solid electrolyte 9 and the conduction aid 10 is in contact with the positive electrode active substance 1, it is preferred that both of the solid electrolyte 9 and the conduction aid 10 are in contact with the positive electrode active substance 1. When both of the solid electrolyte 9 and the conduction aid 10 are in contact with the positive electrode active substance 1, an electron conduction path and an ion conduction path can be created. Here, in the mixed conductive layer 2 of the positive electrode particle 4, the ratio of the solid electrolyte 9 that is in direct contact with the positive electrode active substance 1 is, in terms of a weight ratio, for example, preferably 2 times, more preferably 3 times, and most preferably 5 times of the conduction aid 10 that is in direct contact with the positive electrode active substance 1; but not restricted to the above.

The thickness of the mixed conductive layer 2 that coats the positive electrode active substance 1 constituting the positive electrode particle 4 is basically not restricted. However, when the coating thickness is greater, the void 8 to be generated during the particle-compacting process can be reduced. On the other hand, when the coating thickness is extremely great, the electric resistance of the whole positive electrode increases to jeopardize the conductivity. Therefore, it can be said that the coating thickness has an optimum thickness. Such a coating thickness is preferably less than or equal to $1/10$, more preferably less than or equal to $1/30$, and most preferably less than or equal to $1/100$ of the average particle size of the primary particles of the positive electrode active substance 1. Also, the coating thickness is preferably greater than or equal to $1/1000$ of the average particle size of the primary particles of the positive electrode active substance 1. Also, as an example of the specific size of the coating thickness, the average thickness is preferably greater than or equal to 10 nm and less than or equal to 5 μm, more preferably greater than or equal to 10 nm and less than or equal to 2 μm, and most preferably greater than or equal to 10 nm and less than or equal to 1 μm; but not restricted to the above.

Also, although the method of coating the positive electrode active substance 1 with the mixed conductive layer 2 is basically not restricted, examples thereof include a wet particle compounding method and a dry particle compounding method.

Here, the wet particle compounding method is a method of coating the surface of the positive electrode active substance 1 with a suspension, a solution or the like of the particles of the solid electrolyte 9 and the particles of the conduction aid 10, and drying the coat. The wet particle compounding method is also referred to as an air suspension coating method. Specific examples of the wet particle compounding method include a film method and a coating method. The film method is a method of spraying slurry containing the particles of the solid electrolyte 9 and the particles of the conduction aid 10 on the surface of the particle of the positive electrode active substance 1 to form a coat, and stabilizing the coat by drying. Also, the coating method is a method of attaching a liquid binder to the surface of the positive electrode active substance 1 and thereafter attaching the particles of the solid electrolyte 9 and the particles of the conduction aid 10 to the liquid binder on the surface of the positive electrode active substance 1 to form a coat, and then stabilizing the coat by drying. In the coating method, the solid electrolyte 9 and the conduction aid 10 can also be used as dry particles, but not restricted to the above.

Also, examples of a specific technique of a wet particle compounding device using the wet particle compounding method include a pan coating technique, a fluidized bed granulation technique, a centrifugal rotary fluidized bed technique, a jet dispersion coating technique, and a spray dryer technique; but not restricted to the above.

Also, the dry particle compounding method is a method of using a mechanical or physical means to compound fine powder particles in a dry manner. Examples of the mechanical or physical means specifically include impact, compression, and shear.

Although a specific example of the dry particle compounding method will be indicated below, the dry particle compounding method is not restricted to this example.

First, the particles of the positive electrode active substance 1, the particles of the solid electrolyte 9 and the particles of the conduction aid 10 are stirred and mixed to prepare a mixture. These particles are preferably dry particles. Also, the particle sizes of the primary particle of the solid electrolyte 9 and the primary particle of the conduction aid 10 with respect to the particle size of the primary particle of the positive electrode active substance 1 are, for example, preferably clearly as small as approximately 1/100, and the sizes and the particle sizes described above for each particle can be appropriately selected. Accordingly, the surfaces of some of the dry particles of the positive electrode active substance 1 within this mixture are attached by and coated with the dry particles of the solid electrolyte 9 and the dry particles of the conduction aid 10. However, since the dry particle bonds to the surface of the dry particle of the positive electrode active substance 1 only by inter-particle force such as an electrostatic force, this bonding strength is extraordinarily weak. For example, when a certain force is newly added to this bond, this bond is easily released, causing the coat to peel.

To address this concern, the mechanical and physical energy such as impact, shear and compression is added to this mixture by a pulverizer, a machine to which a pulverizer is applied, or the like. This causes energy to be added to each particle. Thus, a melting and adhering phenomenon, a mechanochemical phenomenon, and the like occur in each particle. When at least one of these phenomena occurs, strong bonding is generated in the contact interface between the particle of the positive electrode active substance 1, and at least one of the particle of the solid electrolyte 9 and the particle of the conduction aid 10. Thus, the coating of the positive electrode active substance 1 can be stabilized. Also, strong bonding occurs in the contact interface with at least one of the particle of the solid electrolyte 9 and the particle of the conduction aid 10. Furthermore, these phenomena cause the contact area in the coating interface to increase and also cause the impedance in the coating interface to decrease. These allow the coat of the mixed conductive layer 2 to strongly bond to the surface of the particle of the positive electrode active substance 1, and the impedance of the whole positive electrode particle 4 to become lower compared to before. Thus, the conductivity improves.

As the configuration ratio among the positive electrode active substance 1, the solid electrolyte 9 and the conduction aid 10 in this mixture, in terms of a weight ratio, for example, the weight of the positive electrode active substance 1 is preferably greater than or equal to 70% and less than 94%, preferably greater than or equal to 80% and less than 94%, and most preferably greater than or equal to 95% and less than 94%, of the weight of the whole mixture. Also, for example, the weight of the solid electrolyte 9 contained in the mixture with respect to the weight of the whole mixture is preferably greater than or equal to 3% and less than or equal to 25%, more preferably greater than or equal to 10% and less than or equal to 25%, and most preferably greater than or equal to 15% and less than or equal to 25%. Also, for example, the weight of the conduction aid 10 with respect to the weight of the whole mixture is preferably greater than or equal to 3% and less than or equal to 10%, more preferably greater than or equal to 3% and less than or equal to 8%, and most preferably greater than or equal to 13% and less than or equal to 6%; but not restricted to the above.

Here, the mechanochemical phenomenon means that the continuous supply of mechanical and physical energy to a solid substance in a situation such as a pulverization process of a solid substance causes high energy to be locally generated in the solid substance thereby to induce a crystallization reaction, a solid-solution reaction, a phase transition reaction, and the like. Also, the processing method of a solid substance using this phenomenon is referred to as mechanochemical processing. Also, the mechanochemical phenomenon is sometimes referred to as a mechanochemical reaction or a mechanochemical effect.

As a specific example of the mechanochemical phenomenon, a case in which mechanical and physical energy is continuously added to a mixture of dry particles will be indicated below. However, the mechanochemical phenomenon is not restricted to this example.

When the mechanical and physical energy is continuously added to a mixture in which a plurality of types of dry particles are mixed, the bonding state of atoms and molecules on the particle surface becomes in disorder especially when the dry particles are a crystalline substance. An increase of the surface atoms and molecules of the solid particle which have lost joints due to this disorder of the bonding state causes the whole surface of the solid particle to become active. A strong aggregation effect is caused among the solid particles each including the whole surface that became active. At this time, when there are two types of particles having different particle sizes in the mixture, this aggregation effect causes the particle having a small particle size (a child particle) to disperse and adsorb to the surface of the particle having a large particle size (a mother particle).

The adsorption of the child particle to the mother particle causes chemical potential on the surface of the mother particle to decrease. Thus, the activity on the surface of the mother particle is lost; the adsorption between the mother particle and the child particle is stabilized; and a compound particle in which the child particle strongly bonds to the surface of the mother particle is generated. These compound particles form a regular mixture in which the whole surface of the mother particle becomes active so that the child particle regularly adsorbs to the particle surface. Also, since the particles having a different particle size are preferentially aggregated, the aggregation among the mother particles are released, and the mother particles are dispersed.

When considering the particle of the positive electrode active substance 1 as the mother particle and the particle of the solid electrolyte 9 and the particle of the conduction aid 10 as the child particle in this mechanochemical phenomenon, at least one of the particle of the solid electrolyte 9 and the particle of the conduction aid 10 strongly adsorbs to the surface of the particle of the positive electrode active substance 1. Also, at least one of the particle of the solid electrolyte 9 and the particle of the conduction aid 10 disperses thereby to regularly adsorb to the surface of the positive electrode active substance 1. In brief, the particle constituting the mixed conductive layer 2 regularly disperses and is immobilized to the particle surface of the positive electrode active substance 1.

This means that the mixed conductive layer 2 is uniformity formed on the particle surface of the positive electrode active substance 1, and further means that there exists an ordered structure in the crystal particle boundary in the bonding interface between the mixed conductive layer 2 and the positive electrode active substance 1. Furthermore, since the positive electrode active substance 1 and the mixed conductive layer 2 are bonded to each other in a physically and electrically strong manner, the impedance in the bonding interface between the positive electrode active substance 1 and the mixed conductive layer 2 can be lowered. Thus, the conductivity of the whole positive electrode particle 4 can be improved.

Furthermore, since the mechanochemical processing causes the aggregation among positive electrode active substances 1 to be released, the mutually neighboring positive electrode active substances 1 disperse without aggregating. This inhibits the surface area of the appearance of the positive electrode active substance 1 from decreasing due to the aggregation among the positive electrode active substance 1.

Also, a solid-solution fusion phenomenon is a phenomenon in which a plurality of solid particles is molten and thereafter fused. The processing method of a solid substance using this phenomenon is referred to as solid fusion processing. As a specific example of the solid-solution fusion phenomenon, a case in which mechanical and physical energy is continuously added to a plurality of solid particles will be specifically indicated below, but not restricted to this example.

The continuous addition of mechanical and physical energy to a plurality of solid particles causes generation of heat in the solid particles themselves. Furthermore, heat is also generated by an increase of the collision and friction energy caused by collision among the solid particles. The surfaces of the solid particles are dissolved with this heat. When other solid particles come into contact with the dissolved surfaces of the solid particles, they adhere to the dissolved surfaces as they are. Then, the heat energy is lost for fusion thereby to form a strong bond. Since the area of the contact interface between the mother particles and the child particles increases due to the fusion depending on this melting and adhering phenomenon, the impedance in the contact interface can be lower compared to the normal adsorption. Thus, the conductivity of the whole positive electrode particle 4 can be improved.

In the dry particle compounding method, it is preferred that one of the mechanochemical phenomenon and the solid-solution fusion phenomenon is present in the interface between the positive electrode active substance 1 and the mixed conductive layer 2 of the positive electrode particle 4; and it is more preferred that both of the phenomena are present; but not restricted to the above.

Also, in the dry particle compounding method, the mechanical and physical energy to be added to the solid particle is preferably an energy with which the particle of the positive electrode active substance 1 does not rupture, more preferably an energy with which the particle of the positive electrode active substance 1 as well as one of the particle of the solid electrolyte 9 and the particle of the conduction aid 10 do not rupture, and most preferably an energy with which all of the particle of the positive electrode active substance 1, the particle of the solid electrolyte 9 and the particle of the conduction aid 10 do not rupture.

Also, the time during which the mechanical and physical energy is added to the solid particle in the dry particle compounding method is preferably more than or equal to 5 minutes and less than or equal to 48 hours, preferably more than or equal to 1 hour and less than or equal to 24 hours, and most preferably more than or equal to 4 hours and less than or equal to 12 hours; but not restricted to the above.

Also, examples of a specific technique of a dry particle compounding device using the dry particle compounding method include a high-speed impact technique, a compression shear technique, an impact compression shear technique, and a mixed shear friction technique. Examples of the high-speed impact technique include a high-speed gas stream impact technique and a vertical rotor impact technique. Also, examples of the compression shear technique include an Angmill technique, and a technique using an interaction between an oval mixed container and an oval rotor. Also, examples of the mixed shear friction technique include a vertical ball mill technique, a vertical spiral movement ball mill technique, and a stirring rotary granulator technique. In all the techniques described above, the melting and adhering phenomenon can be caused among the solid particles to be processed. Also, among the techniques described above, the high-speed impact technique and the compression shear technique are particularly suitable. In these techniques, the mechanochemical phenomenon can be caused in addition to the melting and adhering phenomenon. However, the dry particle compounding device is not restricted to the above.

Figure 4:
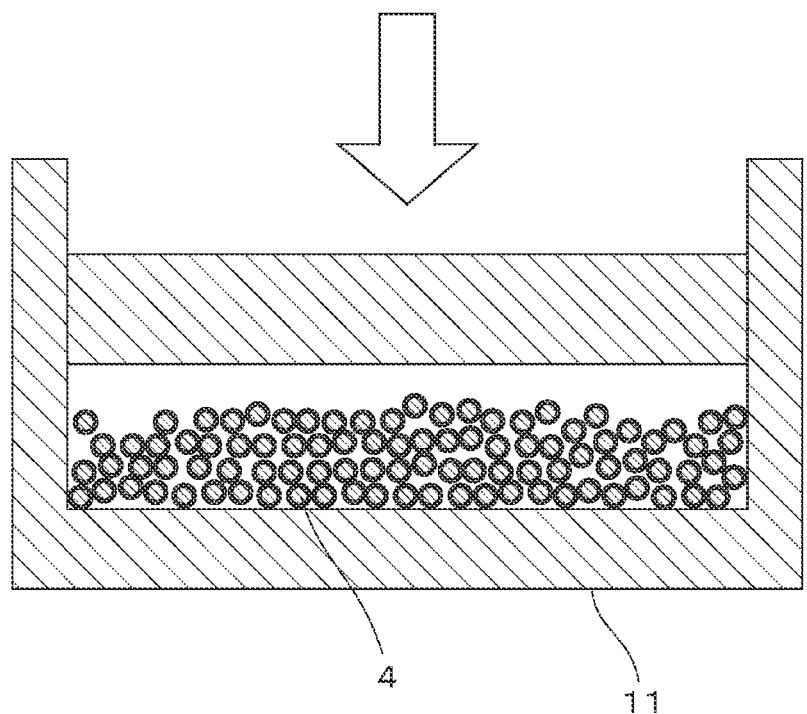
FIG. 4 is a cross-sectional view illustrating the manufacturing method of the positive electrode for a lithium ion battery according to the first embodiment.

Next, a certain amount of the obtained positive electrode particles 4 is aggregated, and the aggregated powder of the positive electrode particles 4 is particle-compacted. Specifically, for example, as illustrated in FIG. 4, the positive electrode particles 4 are placed in a mold 11 or the like, and applied with pressure for particle compaction. In this manner, the positive electrode 3 that is a positive electrode pellet constituted by the aggregate of the positive electrode particles 4 was finished. At this time, an electrode that is a conductive layer may be produced on one of the main surfaces of the positive electrode 3. The electrode can be produced by using a currently known conductive material and appropriately selecting a currently known method. An example of the conductive material includes metal.

Although the particle-compacting method of the aggregated powder of the positive electrode particles 4 is basically not restricted, the particle compaction is specifically performed using various pressing machines such as a hand press machine, a hydraulic pressing machine, and a powder molding pressing machine. Also, the particle compaction of the aggregated powder of the positive electrode particles 4 may be performed only once, or may be performed several times.

Also, the pressure applied to the aggregated powder of the positive electrode particles 4 is basically not restricted. However, specifically, it is preferred to perform particle compaction by pressurizing at a pressure of greater than or equal to 10 MPa; it is more preferred to perform particle compaction by pressurizing at a pressure of greater than or equal to 100 MPa; and it is most preferred to perform particle compaction by pressurizing at a pressure of greater than or equal to 200 MPa. Also, the force of pressurizing the laminate is preferably less than or equal to 1000 MPa in any case, but not restricted to the above.

Also, the particle compaction is preferably cold particle compaction. However, specifically, it is preferred to perform particle compaction at higher than or equal to −10° C. and lower than or equal to 100° C.; it is more preferred to perform particle compaction at higher than or equal to 0° C. and lower than or equal to 50° C.; it is most preferred to perform particle compaction at higher than or equal to 10° C. and lower than or equal to 40° C.; but not restricted to the above. Also, the particle compaction may be warm particle compaction performed at a temperature condition of higher than or equal to 101° C. and lower than or equal to 300° C., or hot particle compaction performed at a temperature condition of higher than or equal to 301° C. and lower than or equal to 500° C. Also, the particle compaction is preferably performed in gas, and particularly preferably performed in dry gas. Typically, the particle compaction is performed in dry atmosphere, but not restricted to the above. For example, the particle compaction may be performed in a vacuum.

Also, the time required for the particle compaction is basically not restricted. However, specifically, for example, in cold particle compaction, more than or equal to 2 minutes and less than or equal to 2 hours is preferred; more than or equal to 10 minutes and less than or equal to 1 hour is more preferred; and more than or equal to 10 and less than or equal to 30 minutes is most preferred; but not restricted to the above.

Next, the manufacturing method of the negative electrode 6 will be described.

The negative electrode particle 7 can be manufactured in a similar manner to the positive electrode particle 4, except that the electrode active substance is the negative electrode active substance 5 in place of the positive electrode active substance 1. Also, the negative electrode 6 can be manufactured in a similar manner to the positive electrode 3, except that the positive electrode particle 4 is substituted with the negative electrode particle 7, but not restricted to the above.

Example 1

There were provided 76 mg of $LiCoO_2$ particles having a particle size of approximately 10 μm as a positive electrode material powder, 76 mg of $Li_4Ti_5O_{12}$ dry particles having a particle size of approximately 10 μm as a negative electrode material powder, 40 mg of $LiAl_3Ti_{1.7}(PO)_3$ dry particles having a particle size of approximately 1 μm as a solid electrolyte, and 8 mg of Ketjen black dry particles having a particle size of 50 nm as a conduction aid.

First, a positive electrode powder that is the positive electrode particles 4 is prepared as below. Seventy six mg of $LiCoO_2$ particles, 20 mg of $LiAl_3Ti_{1.7}(PO)_3$ particles, and 4 mg of Ketjen black particles were mixed to prepare a positive electrode material mixed powder.

Next, the resultant positive electrode material mixed powder was poured in a dry compounding device (Nobilta NOB-300 manufactured by Hosokawa Micron Corporation), and subjected to compounding processing at a revolution of 9000 rpm for 30 minutes. Thus, the particle surface of $LiCoO_2$ was coated and surface-modified with $LiAl_3Ti_{1.7}(PO)_3$ and Ketjen black to obtain a positive electrode powder that is the positive electrode particles 4.

Next, a negative electrode powder that is the negative electrode particles 7 is prepared. Seventy six mg of $Li_4Ti_5O_{12}$ dry particles, 20 mg of $LiAl_3Ti_{1.7}(PO)_3$ dry particles, and 4 mg of Ketjen black dry particles were mixed to prepare a negative electrode material mixed powder.

Next, the resultant mixture was poured in a dry compounding device (Nobilta NOB-300 manufactured by Hosokawa Micron Corporation), and subjected to compounding processing at a revolution of 9000 rpm for 30 minutes. Thus, the particle surface of $Li_4Ti_5O_{12}$ was coated and surface-modified with $LiAl_3Ti_{1.7}(PO)_3$ and Ketjen black to obtain a negative electrode powder that is the negative electrode particles 7.

Figure 5A:
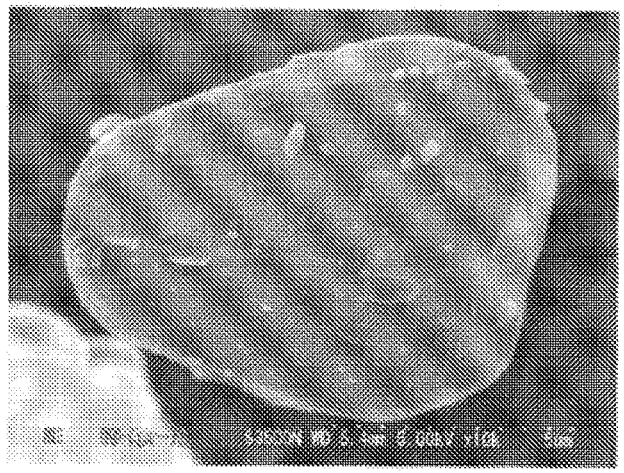
FIG. 5A and FIG. 5B are a drawing-substituting photograph illustrating a SEM photograph of a $LiCoO_2$ particle before surface modification with a mixed conductive layer, and a drawing-substituting photograph illustrating a SEM photograph of the $LiCoO_2$ particle after surface modification with the mixed conductive layer respectively.
Figure 5B:
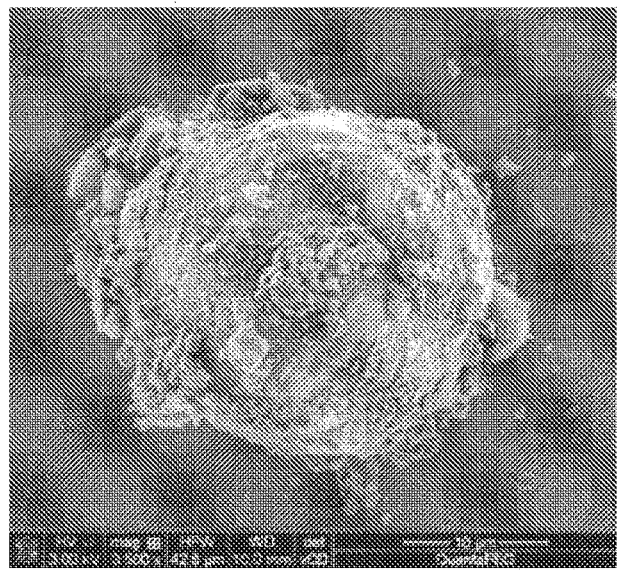

FIG. 5A indicating an $LiCoO_2$ particle before surface modification and FIG. 5B indicating an $LiCoO_2$ particle after surface modification illustrate SEM photographs with which the appearances of respective particles are compared to each other.

Figure 6A:
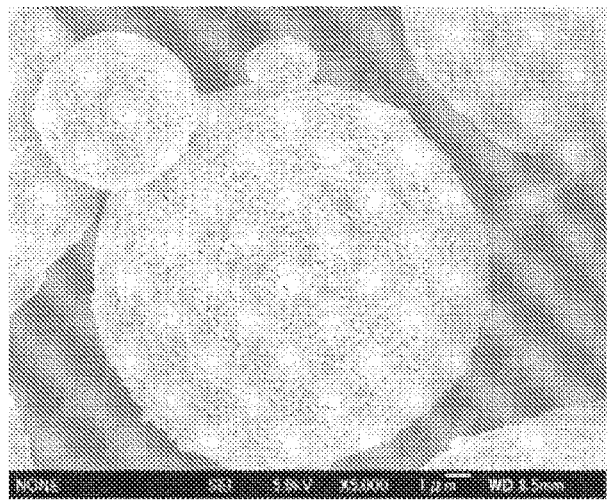
FIG. 6A and FIG. 6B are a drawing-substituting photograph illustrating a SEM photograph of a $Li_4Ti_5O_{12}$ particle before surface modification with a mixed conductive layer, and a drawing-substituting photograph illustrating a SEM photograph of the $Li_4Ti_5O_{12}$ particle after surface modification with the mixed conductive layer respectively.
Figure 6B:
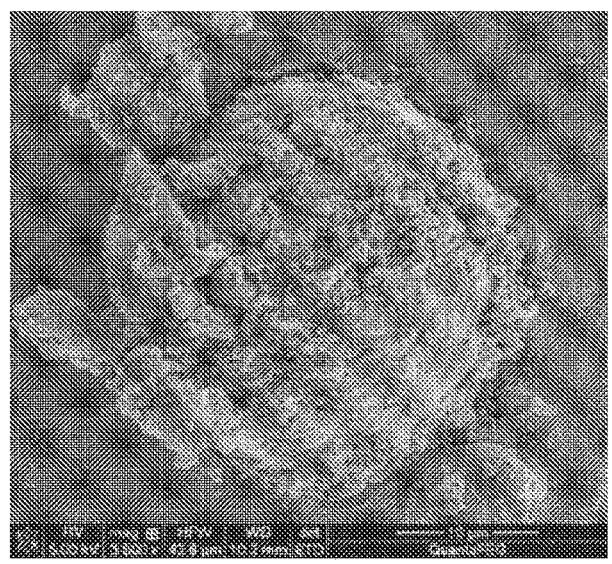

FIG. 6A indicating an $Li_4Ti_5O_{12}$ particle before surface modification and FIG. 6B indicating an $Li_4Ti_5O_{12}$ particle after surface modification illustrate SEM photographs with which the appearances of respective particles are compared to each other.

As illustrated in FIG. 5A and FIG. 5B, the $LiCoO_2$ particle after surface modification includes the whole surface of the $LiCoO_2$ particle coated with a mixed conductive layer constituted by $Li_4Ti_5O_{12}$ and Ketjen black.

Also, as illustrated in FIG. 6A and FIG. 6B, the $Li_4Ti_5O_{12}$ particle after surface modification similarly includes the whole surface of the $Li_4Ti_5O_{12}$ particle coated with the mixed conductive layer.

Also, the $LiCoO_2$ particle after surface modification has a more spherical shape compared to the $LiCoO_2$ particle before surface modification. It is considered that this is because the convex of the particle is smashed, abraded, redeposited, and the like due to mechanical energy such as a shear force applied to the particle during dry compounding processing so that the particle surface becomes as if chamfered.

Therefore, the $LiCoO_2$ particle to be poured in a dry compounding device is not necessarily spherical; and the shapes described above as the positive electrode active substance 1, a shape having a plurality of concaves and convexes, or the like can be appropriately selected. This can also apply to the positive electrode active substance 1, the negative electrode active substance 5, the solid electrolyte 9 and the conduction aid 10 described above, but not restricted to the above.

Figure 7:
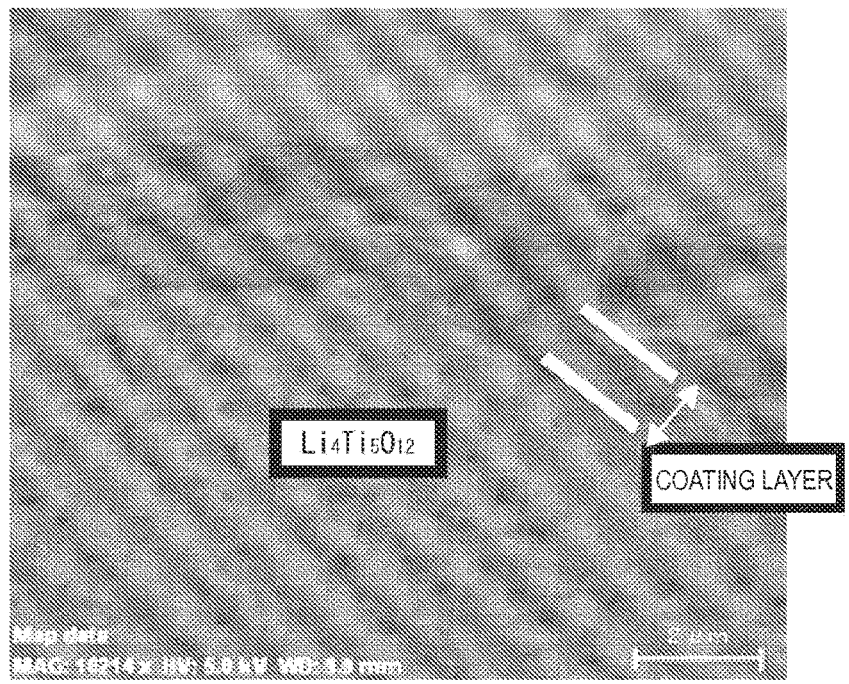
FIG. 7 is a drawing-substituting photograph illustrating a SEM photograph of a cross section of a negative electrode particle.
Figure 8:
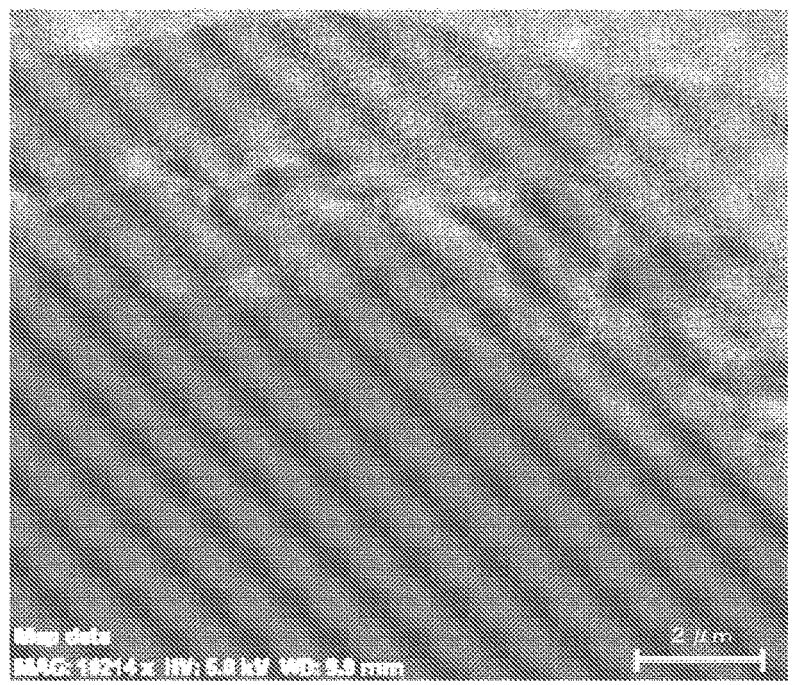
FIG. 8 is a drawing-substituting photograph illustrating a SEM-EDX photograph of a cross section of a negative electrode particle.
Figure 9:
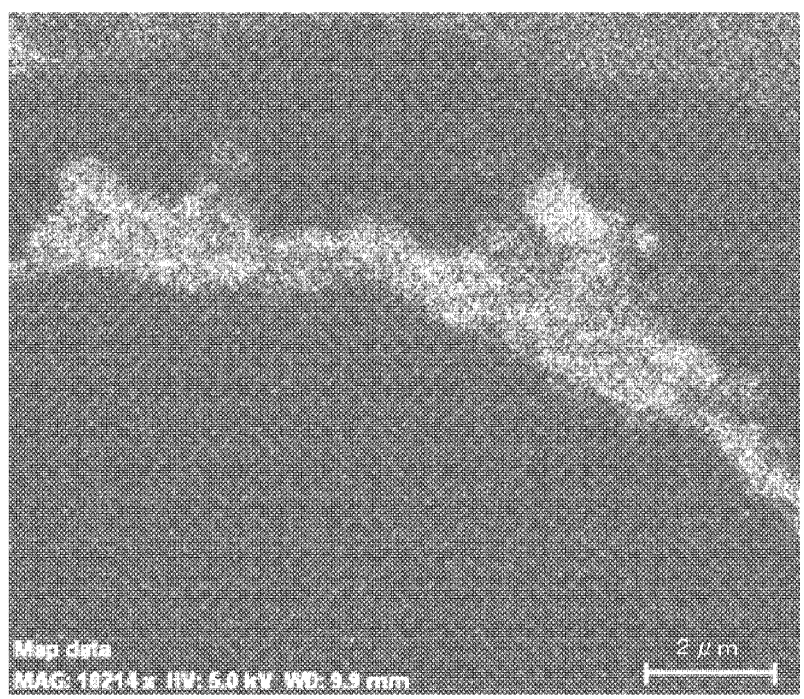
FIG. 9 is a drawing-substituting photograph illustrating a SEM-EDX photograph of a cross section of a negative electrode particle.

FIG. 7, FIG. 8 and FIG. 9 illustrate SEM photographs when the cross section SEM-EDX measurement of the obtained negative electrode powder was performed. FIG. 7 is a SEM photograph of the cross section of the negative electrode powder; and FIG. 8 and FIG. 9 are SEM-EDX images obtained by irradiating the cross section of the negative electrode powder with X-rays for studying the composition of the coating layer in the cross section of the negative electrode powder. The bright section in FIG. 8 indicates existence of Ketjen black; and the bright section in FIG. 9 indicates existence of $LiAl_3Ti_{1.7}(PO)_3$.

As illustrated in FIG. 7, a coating layer is formed on the surface of $Li_4Ti_5O_{12}$ to constitute a negative electrode powder. The coating thickness thereof was approximately 1 μm. Also, the surface of $Li_4Ti_5O_{12}$ and the coating layer are favorably bonded without interstices therebetween. It is considered that this is due to the mechanochemical effect and the solid-solution fusion in the contact interface. Also, as illustrated in FIG. 8 and FIG. 9, it became clear that Ketjen black and $LiAl_3Ti_{1.7}(PO)_3$ are present in this coating layer, and that the surface of $Li_4Ti_5O_{12}$ is coated with a mixed conductive layer having Ketjen black and $LiAl_3Ti_{1.7}(PO)_3$. It is considered that this also applies to the particle surface of $LiCoO_2$ that is a positive electrode material.

Next, 0.17 g of the obtained positive electrode powder was placed in a cylinder mold with a diameter of 16 mm, and pressurized at a pressure of 20 MPa using a hand press machine. Thus, there was obtained a positive electrode pellet having a height of 0.3 mm and having a circular bottom with a diameter of 16 mm.

Similarly, 0.11 g of the obtained negative electrode powder was placed in a cylinder mold with a diameter of 16 mm, and pressurized at a pressure of 20 MPa using a hand press machine. Thus, there was obtained a negative electrode pellet having a height of 0.3 mm and having a circular bottom with a diameter of 16 mm.

As described above, the positive electrode for a lithium ion battery and the negative electrode for a lithium ion battery were manufactured.

According to the manufacturing method of the electrode for a lithium ion battery of the first embodiment, there can be obtained a novel electrode for a lithium ion battery having an aggregate of electrode particles. In each of the electrode particles, the surface of a granular electrode active substance is coated with the mixed conductive layer 2 containing a mixture of the granular solid electrolyte 9 and the granular conduction aid 10.

Furthermore, since the electrode for a lithium ion battery was manufactured by coating the electrode active substance with the mixed conductive layer 2 to manufacture an electrode particle and thereafter particle-compacting the electrode particle, the firing process which has been required for the manufacture can be omitted thereby to simplify the processes. Furthermore, the production can be accomplished at normal temperature and under atmospheric environment, and extensive facilities are not required for the manufacture. Therefore, the manufacturing cost can be considerably lowered.

Also, since the firing process is not used for the manufacture, an increase in the impedance of the electrode or the like due to a change in substance of the material, a movement of the particle boundary, and the like caused by the side reaction in the firing process does not occur. Therefore, there can be obtained an electrode for a lithium ion battery that is excellent in conductivity compared to before. Also, particularly, when coating the electrode active substance with the mixed conductive layer 2 by the dry particle compounding method, the electrode active substance and the mixed conductive layer 2 are bonded through the mechanochemical bond and/or the solid-solution fusion bond. Thus, there can be obtained an electrode particle in which the both are favorably bonded physically and electrically.

Furthermore, when the aggregate of the electrode particles is used as the electrode, the impedance in the particle boundary can be considerably reduced. Accordingly, the conductivity in the whole electrode for a lithium ion battery can be increased. As described above, since the electrode performance can be significantly increased only due to the structure of the electrode, there can be obtained an all solid-state lithium ion battery having excellent conductivity even when the electrode is manufactured with a material having a high impedance in the particle boundary, such as an oxide.

2. Second Embodiment

[Electrode for Lithium Ion Battery]

Next, a second embodiment will be described. In the second embodiment, a second mixed conductive layer is disposed in at least a portion of the space between the mutually neighboring electrode particles in the electrode for a lithium ion battery according to the first embodiment.

Figure 10A:
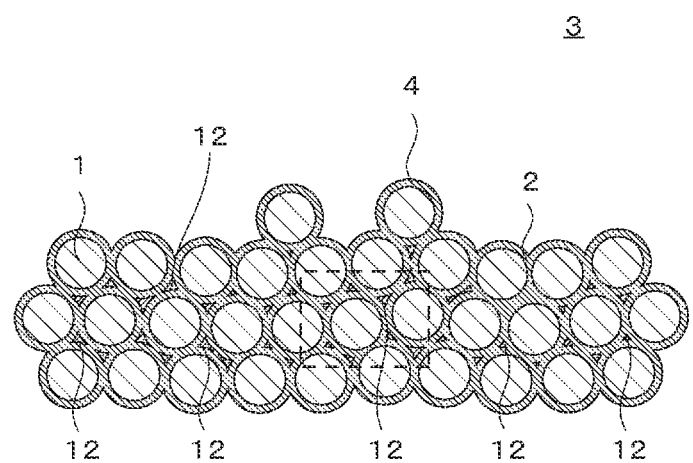
FIG. 10A and FIG. 10B are a cross-sectional view illustrating the positive electrode for a lithium ion battery according to the second embodiment and a cross-sectional view illustrating the negative electrode for a lithium ion battery according to the second embodiment respectively.
Figure 10B:
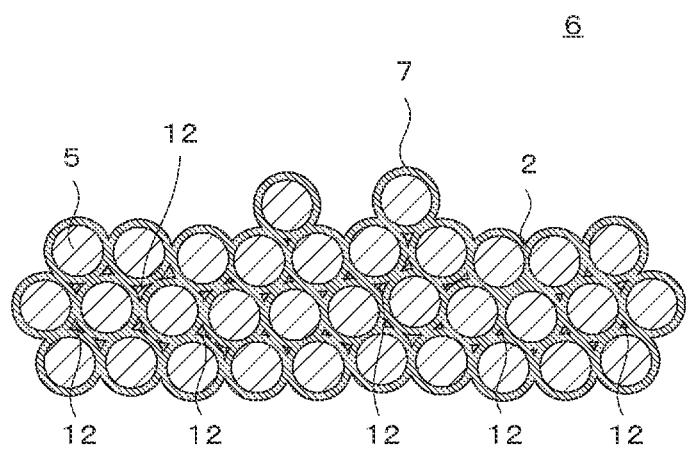

FIG. 10A and FIG. 10B are a cross-sectional view illustrating the electrode for a lithium ion battery according to the second embodiment. Here, FIG. 10A is a positive electrode for a lithium ion battery, and FIG. 10B is a negative electrode for a lithium ion battery.

As illustrated in FIG. 10A, a positive electrode 3 for a lithium ion battery (hereinafter, referred to as a positive electrode 3) is constituted by an aggregate of positive electrode particles 4 each containing a positive electrode active substance 1 as a granular electrode active substance coated with the mixed conductive layer 2, and is disposed such that the space between the mutually neighboring positive electrode particles 4 is occupied by the mixed conductive layer 2 and a second mixed conductive layer 12. The second mixed conductive layer 12 is disposed so as to occupy at least a portion of the space surrounded by the mixed conductive layer 2. The mixed conductive layer 2 and the second mixed conductive layer 12 are disposed next to each other.

As illustrated in FIG. 10B, a negative electrode 6 for a lithium ion battery (hereinafter, referred to as a negative electrode 6) is constituted by a plurality of granular negative electrode active substances 5 in place of the positive electrode active substances 1, a mixed conductive layer 2, and a second mixed conductive layer 12, and is disposed such that the space between the mutually neighboring negative electrode particles 7 is occupied by the mixed conductive layer 2 and the second mixed conductive layer 12. Otherwise, the negative electrode 6 is similar to the positive electrode 3.

The mixed conductive layer 2 and the second mixed conductive layer 12 both constituting the positive electrode 3 are basically not restricted, as long as they are disposed so as to occupy the space between the positive electrode active substances 1 that are mutually neighboring electrode active substances, and are appropriately disposed depending on necessity. The mixed conductive layer 2 and the second mixed conductive layer 12 are preferably disposed such that all of the mutually neighboring positive electrode active substances 1 in the positive electrode 3 are in contact with each other through the mixed conductive layer 2 and the second mixed conductive layer 12, but not restricted to the above. This applies to the negative electrode 6 having the negative electrode active substance 5 as the electrode active substance.

Figure 11:
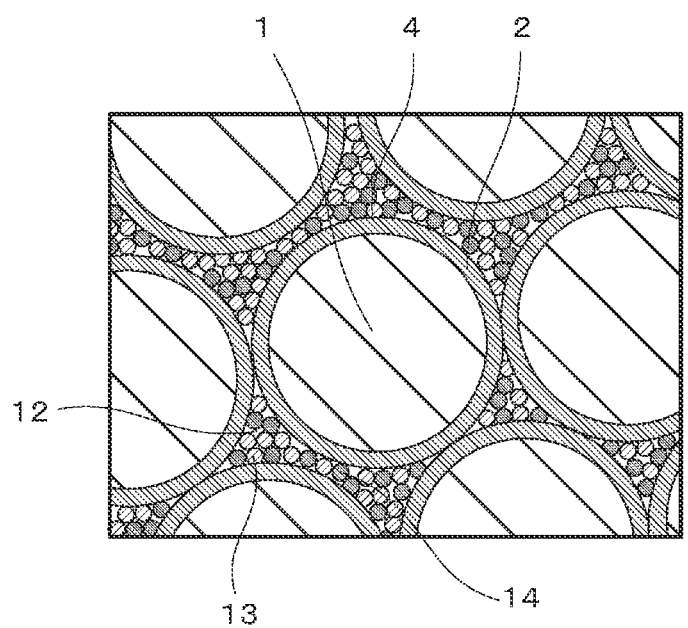
FIG. 11 is an enlarged view of a portion surrounded by a dashed line of the positive electrode for a lithium ion battery according to the second embodiment.

FIG. 11 illustrates an enlarged view of a portion surrounded by a dashed line of the positive electrode 3 in FIG. 10A.

As illustrated in FIG. 11, the positive electrode particle 4 is constituted by disposing the mixed conductive layer 2 in such a manner as to cover the surface of the positive electrode active substance 1 as the electrode active substance. Although the detailed view of the mixed conductive layer 2 is omitted, it includes the solid electrolyte 9 and the conduction aid 10 in a similar manner to the view of FIG. 2. The positive electrode 3 has a plurality of the positive electrode particles 4, and the positive electrode particles 4 are in contact with each other to form an aggregate. The mixed conductive layers 2 each constituting each of the mutually neighboring positive electrode particles 4 are in contact with each other. A granular second solid electrolyte 13 and a granular second conduction aid 14 are disposed in at least a portion of the space between the mutually neighboring positive electrode particles 4.

The second mixed conductive layer 12 constituting the positive electrode 3 is basically not restricted, as long as it is disposed in such a manner as to occupy at least a portion of the space between neighboring positive electrode particles 4. However, it is preferred that the whole space between the mutually neighboring positive electrode particles 4 is occupied. Furthermore, it is more preferred that the above space is a space surrounded by the mixed conductive layer 2. Also, in this case, the space between the neighboring positive electrode particles 4 becomes a portion having a space at least larger than the size of the second conduction aid 14 or the second solid electrolyte 13.

The positive electrode particles 4 are basically not restricted, as long as at least some of the mutually neighboring positive electrode particles 4 are aggregated in such a manner as to be in contact with each other. Although the mutually neighboring positive electrode particles 4 may be in contact with each other through the second mixed conductive layer 12, it is most preferred that all of the mutually neighboring positive electrode particles 4 are aggregated in such a manner as to be in contact with each other.

As the second solid electrolyte 13, any material may be basically used. However; the materials described above as the solid electrolyte can be appropriately selected. Also, the second solid electrolyte 13 may be made of the same material as the solid electrolyte 9 contained in the mixed conductive layer 2, or may be made of a different material therefrom. However, the second solid electrolyte 13 is preferably made of a similar material to the solid electrolyte 9.

The shape of the second solid electrolyte 13 may be basically any shape. However; the shapes described above as the solid electrolyte can be appropriately selected. Also, the second solid electrolyte 13 may have the same shape as the solid electrolyte 9 contained in the mixed conductive layer 2, or may have a different shape therefrom. However, the second solid electrolyte 13 preferably has a similar shape to the solid electrolyte 9.

The size of the second solid electrolyte 13 may not be basically restricted, but can be appropriately selected from the sizes and the particle sizes described above as the size of the solid electrolyte 9. Particularly, in order to reduce the interstices inside the electrode, it is preferred that the size of the second solid electrolyte 13, and the size of the solid electrolyte 9 constituting the electrode particle are substantially equal. Accordingly, the ratio in size between the second solid electrolyte 13 and the solid electrolyte 9 is, for example, preferably mutually greater than or equal to $\frac{1}{5}$ times and less than or equal to 5 times, more preferably mutually greater than or equal to $\frac{1}{2}$ times and less than or equal to 2 times, and most preferably mutually greater than or equal to $\frac{2}{3}$ times and less than or equal to 3/2 times. An example of the size in this case includes the average particle size of the primary particles, but not restricted to the above.

As the second conduction aid 14, any material may be basically used. However; the materials described above as the conduction aid can be appropriately selected. Also, the second conduction aid 14 may be made of the same material as the conduction aid 10 contained in the mixed conductive layer 2, or may be made of a different material therefrom. However, the second conduction aid 14 is preferably made of a similar material to the conduction aid 10.

The shape of the second conduction aid 14 may be basically any shape. However; the shapes described above as the conduction aid can be appropriately selected. Also, the second conduction aid 14 may have the same shape as the conduction aid 10 contained in the mixed conductive layer 2, or may have a different shape therefrom. However, the second conduction aid 14 preferably has a similar shape to the conduction aid 10.

The size of the second conduction aid 14 may not be basically restricted, but can be appropriately selected from the sizes and the particle sizes described above as the size of the conduction aid 10. Particularly, in order to reduce the interstices inside the electrode, it is preferred that the size of the second conduction aid 14, and the size of the conduction aid 10 constituting the electrode particle are substantially equal. Accordingly, the ratio in size between the second conduction aid 14 and the conduction aid 10 is, for example, preferably mutually greater than or equal to $\frac{1}{5}$ times and less than or equal to 5 times, more preferably mutually greater than or equal to $\frac{1}{2}$ times and less than or equal to 2 times, and most preferably mutually greater than or equal to $\frac{2}{3}$ times and less than or equal to 3/2 times. An example of the size in this case includes the average particle size of the primary particles, but not restricted to the above.

The ratio of the whole mixed conductive layer to the positive electrode 3 is basically not restricted. However, in terms of a weight ratio, for example, a total weight of the mixed conductive layer 2 and the second mixed conductive layer 12 to the weight of the positive electrode 3 is preferably greater than or equal to 6% and less than or equal to 30%, more preferably greater than or equal to 6% and less than or equal to 25%, and most preferably greater than or equal to 6% and less than or equal to 20%. In this case, the ratio of the mixed conductive layer 2 to the positive electrode 3 is, in terms of a weight ratio, for example, preferably greater than or equal to 1% and less than or equal to 25%, more preferably greater than or equal to 1% and less than or equal to 20%, and most preferably greater than or equal to 1% and less than or equal to 15%, of the weight of the positive electrode 3; but not restricted to the above.

The ratio between the second mixed conductive layer 12 contained in the positive electrode 3 and the second solid electrolyte 13 is basically not restricted. However, in terms of a weight ratio, for example, a total weight of the solid electrolyte 9 contained in the mixed conductive layer 2 and the second solid electrolyte 13 to the weight of the positive electrode 3 is preferably greater than or equal to 3% and less than or equal to 25%, more preferably greater than or equal to 3% and less than or equal to 20%, and most preferably greater than or equal to 3% and less than or equal to 15%. In this case, the ratio of the solid electrolyte 9 to the mixed conductive layer 2 is, in terms of a weight ratio, for example, preferably greater than or equal to 1% and less than or equal to 20%, more preferably greater than or equal to 1% and less than or equal to 15%, and most preferably greater than or equal to 1% and less than or equal to 10%, of the weight of the positive electrode 3; but not restricted to the above.

The ratio between the second mixed conductive layer 12 and the second conduction aid 14 contained in the positive electrode 3 is basically not restricted. However, in terms of a weight ratio, for example, a total weight of the conduction aid 10 contained in the mixed conductive layer 2 and the second conduction aid 14 is preferably greater than or equal to 3% and less than or equal to 25%, more preferably greater than or equal to 3% and less than or equal to 20%, and most preferably greater than or equal to 3% and less than or equal to 15%, of the weight of the positive electrode 3. In this case, the ratio of the solid electrolyte 9 to the mixed conductive layer 2 is, in terms of a weight ratio, for example, preferably greater than or equal to 1% and less than or equal to 20%, more preferably greater than or equal to 1% and less than or equal to 15%, and most preferably greater than or equal to 1% and less than or equal to 10%, of the weight of the positive electrode 3; but not restricted to the above.

Also, the ratio between the second solid electrolyte 13 and the second conduction aid 14 contained in the second mixed conductive layer 12 is basically not restricted. However, for example, the ratio is preferably similar to the weight ratio between the solid electrolyte 9 and the conduction aid 10 contained in the mixed conductive layer 2 constituting the above positive electrode 3; and the range described above as the weight ratio between the solid electrolyte 9 and the conduction aid 10 contained in the mixed conductive layer 2 can be appropriately selected.

Also, the above described regarding the positive electrode 3 similarly applies to the negative electrode 6, by substituting the positive electrode 3 with the negative electrode 6, the positive electrode particle 4 with the negative electrode particle 7, and the positive electrode active substance 1 that is an electrode active substance in the positive electrode 3 with the negative electrode active substance 5. Here, the negative electrode active substance 5 can be appropriately selected from the above described as the electrode active substance. Also, the solid electrolyte 9 and the conduction aid 10 contained in the negative electrode 6 may be the same as or different from those contained in the positive electrode 3, but not restricted to the above described.

According to the electrode for a lithium ion battery of the second embodiment, the electrode is constituted by the aggregate of the electrode particles each including a granular electrode active substance coated with the mixed conductive layer 2, and is configured such that the second mixed conductive layer 12 is disposed in the space between the mutually neighboring electrode particles. Therefore, while having an advantage similar to the electrode for a lithium ion battery according to the first embodiment and also reducing the coating thickness of the mixed conductive layer 2 in the electrode particle to improve the conductivity, the second mixed conductive layer enables securement of an ion conduction path and an electron conduction path. Accordingly, the ion conduction path and the electron conduction path are sufficiently disposed between the mutually neighboring electrode active substances, thereby enabling improvement of the efficiency in ion conductivity and electric conductivity inside the electrode. For this reason, the lowered impedance in the whole electrode allows the conductivity to dramatically improve.

[Manufacturing Method of Electrode for Lithium Ion Battery]

The electrode for a lithium ion battery can be, for example, manufactured as below.

First, the manufacturing method of the positive electrode 3 will be described.

FIG. 12A, FIG. 12B, FIG. 12C and FIG. 13 are cross-sectional views illustrating the manufacturing process of the positive electrode 3.

Figure 12A:
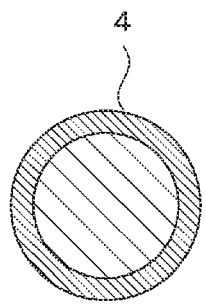
FIG. 12A, FIG. 12B and FIG. 12C are a cross-sectional view illustrating the manufacturing method of the positive electrode for a lithium ion battery according to the second embodiment, a cross-sectional view illustrating the manufacturing method of the positive electrode for a lithium ion battery according to the second embodiment, and a cross-sectional view illustrating the manufacturing method of the positive electrode for a lithium ion battery according to the second embodiment respectively.
Figure 12B:
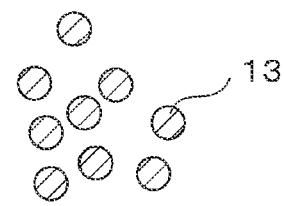
Figure 12C:
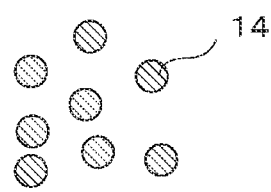

As illustrated in FIG. 12A, FIG. 12B and FIG. 12C, firstly, the positive electrode particle 4, particles of the second solid electrolyte 13 and particles of the second conduction aid 14 are provided as the materials constituting the positive electrode 3. The positive electrode particle 4 is manufactured in a similar manner to the first embodiment.

The second solid electrolyte 13 can be appropriately selected from the above described as the solid electrolyte, but particularly, is preferably a solid particle at normal temperature, and further preferably a dry particle; but not restricted to the above described.

The shape of the second solid electrolyte 13 is basically any shape as long as it is granular, and can be appropriately selected from the shapes described above as the solid electrolyte depending on necessity. However, among the above described, it is preferred to be a spherical particle.

The conduction aid 14 can be appropriately selected from the above described as the conduction aid, but particularly, is preferably a solid particle at normal temperature, and more preferably a dry particle; but not restricted to the above described.

The shape of the second conduction aid 14 is basically any shape as long as it is granular, and can be appropriately selected from the shapes described above as the conduction aid depending on necessity. However, among the above described, it is preferred to be a spherical particle.

Next, the positive electrode particles 4, the particles of the second solid electrolyte 13 and the particles of the second conduction aid 14 are mixed to prepare a positive electrode particle mixture.

Figure 13:
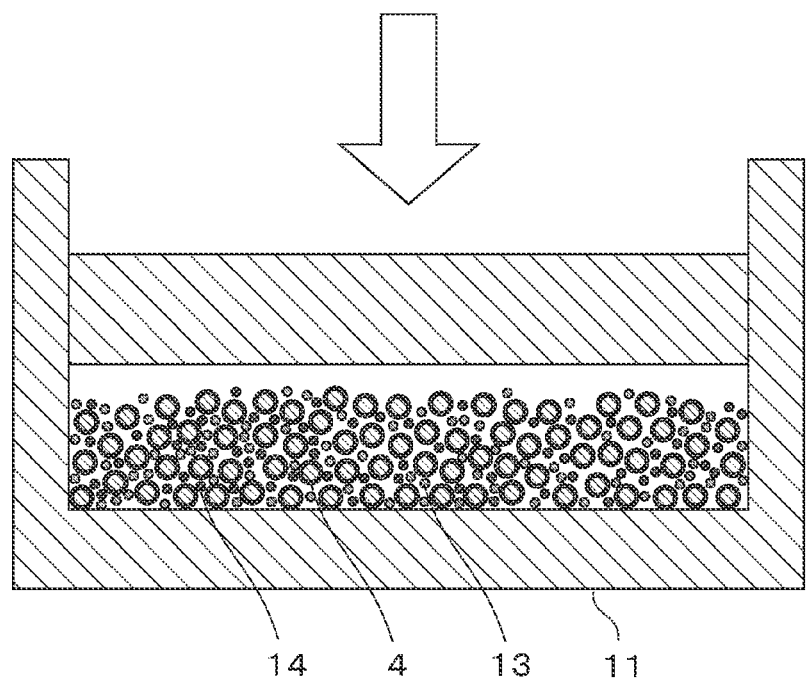
FIG. 13 is a cross-sectional view illustrating the manufacturing method of the positive electrode for a lithium ion battery according to the second embodiment.

Next, a certain amount of the positive electrode particle mixture is aggregated, and the aggregated positive electrode particle mixture is compacted. Specifically, for example, as illustrated in FIG. 13, the positive electrode particle mixture is placed in a mold 11 or the like, and uniformly pressurized from the opening of the mold 11 for particle compaction. In this manner, the positive electrode 3 that is a positive electrode pellet constituted by an aggregate of the positive electrode particles 4 was finished. At this time, an electrode that is a conductive layer may be produced on one of the main surfaces of the positive electrode 3. The electrode can be produced by using a currently known conductive material and appropriately selecting a currently known method. An example of the conductive material includes metal.

The particle compaction method of the mixture, the pressure of the particle compaction, the particle compaction time, and the like are basically not restricted. However, it is preferred that the particle compaction is performed in a similar manner to the particle compaction of the aggregate of the positive electrode particles 4 in the first embodiment; and the above described can be appropriately selected when performing particle compaction of the aggregate of the positive electrode particles 4.

The negative electrode particle 7 can be manufactured in a similar manner to the positive electrode particle 4, except that the positive electrode active substance 1 is substituted with the negative electrode active substance 5. Also, the negative electrode 6 can be manufactured in a similar manner to the positive electrode 3, except that the positive electrode particle 4 is substituted with the negative electrode particle 7, but not restricted to the above.

Otherwise, the manufacturing method of the electrode for a lithium ion battery according to the first embodiment is applied.

Example 2

First, the positive electrode powder and the negative electrode powder were manufactured in a similar manner to Example 1.

Next, 76 g of the obtained positive electrode powder, 20 g of $LiAl_3Ti_{1.7}(PO_4)_3$ as the second solid electrolyte, and 4 g of Ketjen black as the second conduction aid were mixed to prepare a positive electrode powder mixture.

Next, 0.17 g of the positive electrode particle mixed powder was placed in a cylinder mold with a diameter of 16 mm, and pressurized at a pressure of 20 MPa using a hand press machine. Thus, a positive electrode pellet having a height of 0.3 mm and having a circular bottom with a diameter of 16 mm was obtained.

Similarly, 76 g of the obtained negative electrode powder, 20 g of $LiAl_3Ti_{1.7}(PO_4)_3$ as the second solid electrolyte, and 4 g of Ketjen black as the second conduction aid were mixed to prepare a negative electrode powder mixture.

Next, 0.11 g of the negative electrode particle mixed powder was placed in a cylinder mold with a diameter of 16 mm, and pressurized at a pressure of 20 MPa using a hand press machine. Thus, a negative electrode pellet having a height of 0.3 mm and having a circular bottom with a diameter of 16 mm was obtained.

As described above, the positive electrode for a lithium ion battery and the negative electrode for a lithium ion battery are manufactured.

According to the manufacturing method of the electrode for a lithium ion battery of the second embodiment, there can be obtained a novel electrode for a lithium ion battery that has a similar advantage to the manufacturing method of the electrode for a lithium ion battery according to the first embodiment, and that further has an aggregate of electrode particles each including the surface of a granular electrode active substance coated with the mixed conductive layer 2 containing a mixture of the granular solid electrolyte 9 and the granular conduction aid 10, and has the second mixed conductive layer 12 disposed in such a manner as to occupy at least a portion of the space between the mutually neighboring electrode particles.

Also, when the electrode active substance is coated with the mixed conductive layer 2 by the dry particle compounding method to produce the electrode particle, the second mixed conductive layer 12 occupying the space of the mixed conductive layers in the electrode is disposed independently from the mixed conductive layer 2 bonding to the electrode active substance by a mechanochemical bond and/or a solid-solution fusion bond. Therefore, compared to when only the mixed conductive layer 2 is disposed, an electron and an ion transferring from the mixed conductive layer 2 can be efficiently delivered to the neighboring mixed conductive layer 2, thereby to reduce the impedance of the whole electrode.

3. Third Embodiment

[Lithium Ion Battery]

Next, a third embodiment will be described. In the third embodiment, as an electrode for a lithium ion battery as a secondary battery, the electrode for a lithium ion battery according to the first embodiment is used.

Figure 14:
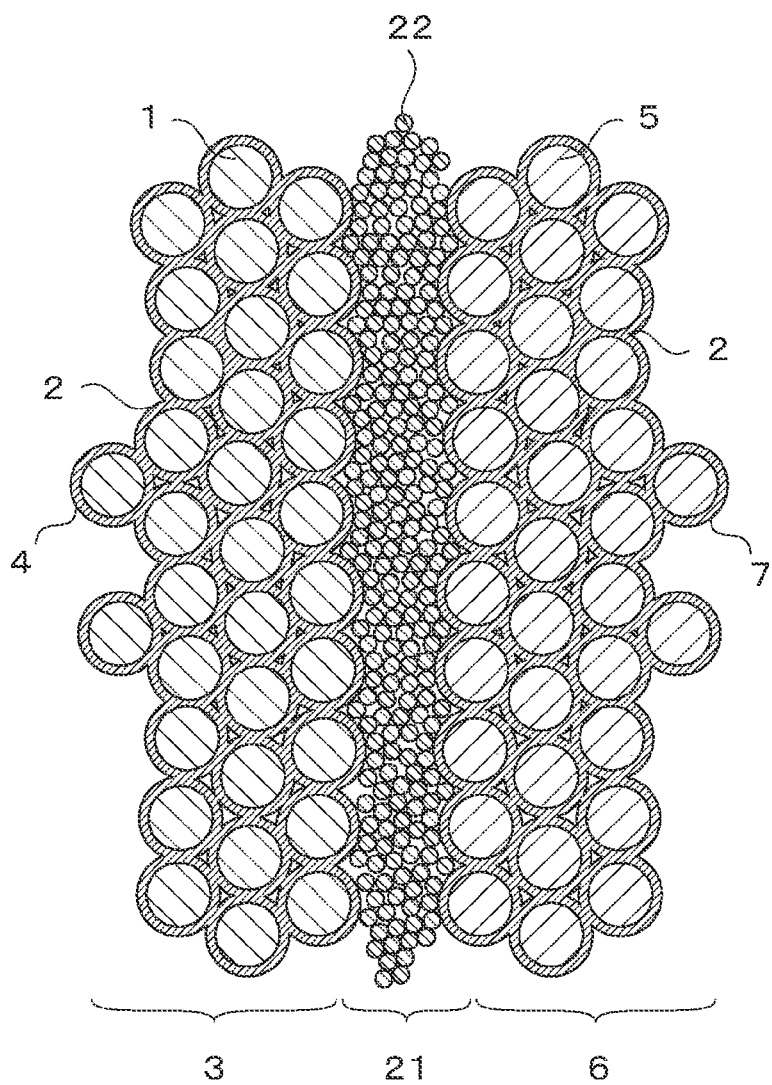
FIG. 14 is a cross-sectional view illustrating the lithium ion battery according to the third embodiment.

FIG. 14 is a cross-sectional view illustrating the electrode for a lithium ion battery according to the third embodiment.

As illustrated in FIG. 14, a lithium ion battery 20 has a structure in which a positive electrode 3 and a negative electrode 6 face each other through a solid electrolyte layer 21. As the positive electrode and the negative electrode 6, the positive electrode and the negative electrode for a lithium ion battery according to the first embodiment are used.

A third solid electrolyte 22 constituting a solid electrolyte layer 21 is made of at least one selected from the above described as the solid electrolyte, but preferably constituted by a similar material to the solid electrolyte 9 contained in the positive electrode 3 and/or the negative electrode.

The shape of the solid electrolyte layer 21 may be basically any shape as long as it is in contact with at least a portion of the positive electrode 3 and at least a portion of the negative electrode 6. However, when the positive electrode 3 and the negative electrode 6 both being an electrode have a planar shape, the solid electrolyte layer 21 preferably has a planar shape. In this case, the area of the main surface of the solid electrolyte layer 21 is preferably larger than the main surface of the electrode, and more preferably has a similar size to the main surface of the electrode; but not restricted to the above.

The shape of the third solid electrolyte 22 may be basically any shape as long as it is granular, and can be appropriately selected from the shapes described above as the solid electrolyte. Among the above shapes, it is particularly preferred to be a spherical particle, but not restricted to the above shapes.

The size of the third solid electrolyte 22 is not be basically restricted, but can be appropriately selected from the sizes and the particle sizes described above as the size of the solid electrolyte 9. Particularly, in order to reduce the interstices between the solid electrolyte layer 21 and the electrode, it is preferred that the size of the third solid electrolyte 22 and the sizes of the solid electrolyte 9 and the conduction aid 10 constituting the electrode particle are substantially equal. Accordingly, the ratio in size between the second solid electrolyte 22 and the solid electrolyte 9 is, for example, preferably mutually greater than or equal to ⅕ times and less than or equal to 5 times, more preferably mutually greater than or equal to ⅓ times and less than or equal to 2 times, and most preferably mutually greater than or equal to ⅔ times and less than or equal to 3/2 times. An example of the size in this case includes the average particle size of the primary particles. Also, in this case, the sizes of the conduction aid 10 and the electrode active substance are appropriately determined according to the above ratio with respect to the solid electrolyte 9, but not restricted to the above.

[Operation of Lithium Ion Battery]

Figure 15:
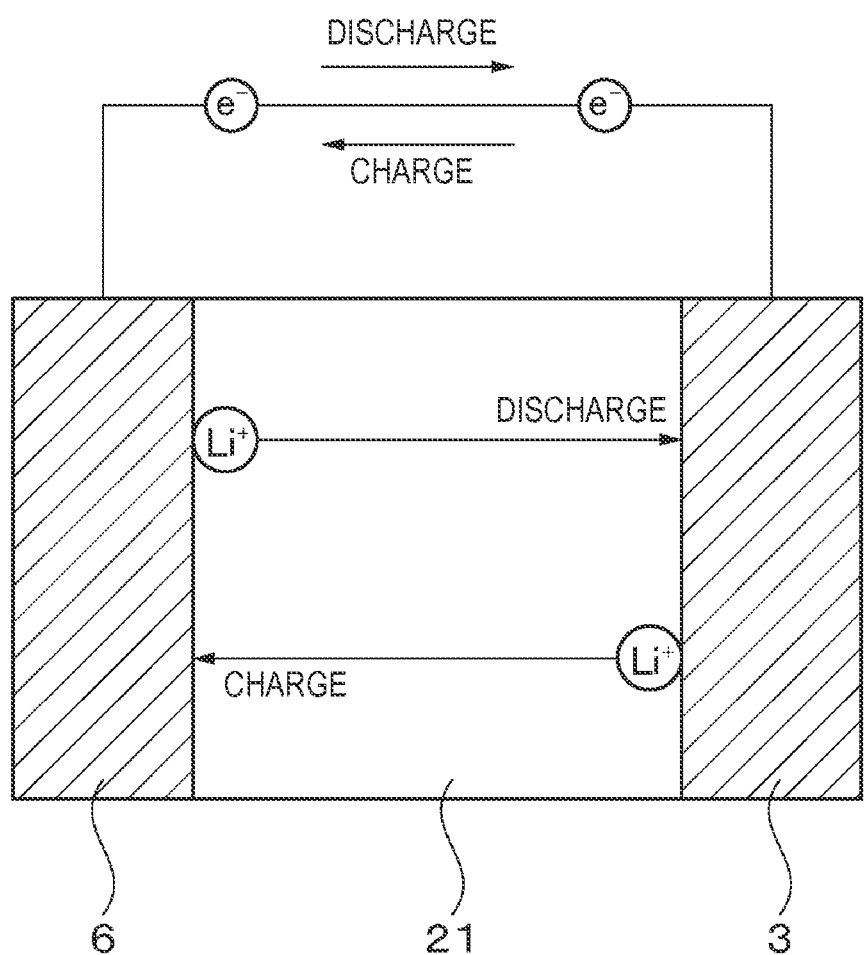
FIG. 15 is a schematic diagram for explaining operation of a lithium ion battery.

FIG. 15 is a schematic diagram for explaining the operation of the lithium ion battery. As illustrated in FIG. 15, in this lithium ion battery, a lithium ion ($Li^+$) moves from the positive electrode 3 to the negative electrode 6 through the solid electrolyte layer 21 during charging so that electric energy is converted to chemical energy to store electricity. A lithium ion returns from the negative electrode 6 to the positive electrode 3 through the solid electrolyte layer 21 during discharging so that electric energy is generated. Such leaving and entering of a lithium ion are performed between the positive electrode active substance 1 in the positive electrode 3 and the negative electrode active substance 5 in the negative electrode 6. At this time, the solid electrolyte 9 functions as a conduction path of a lithium ion, and the conduction aid 10 functions as a conduction path of an electron.

According to the lithium ion battery of the third embodiment, the positive electrode 3 and the negative electrode 6 face each other through the solid electrolyte layer 21; the positive electrode 3 and the negative electrode 6 function as the electrode for a lithium ion battery according to the first embodiment; and furthermore, the battery is an all solid-state battery. Therefore, while having a similar advantage to the first embodiment, the safety of the battery dramatically improves, and the sealing of the battery, which has been required in the existing lithium ion battery, becomes unnecessary. Also, since the impedance of the electrode is lower than the existing all solid-state lithium ion battery, the electric conductivity in the whole battery is high. Accordingly, the rate properties of the all solid-state lithium ion battery can be dramatically improved compared to before. Furthermore, since the electrode is constituted by the aggregate of the electrode particles each including the electrode active substance coated with the mixed conductive layer, the bonding properties between the solid electrolyte layer and the electrode improve particularly when the size of the solid electrolyte constituting the mixed conductive layer and the size of the third solid electrolyte constituting the electrolyte layer are substantially equal. Also, even when the all solid-state lithium ion battery is constituted by a material having a low ion conductivity, such as an oxide, the rate properties are higher than the existing all solid-state lithium ion battery constituted by a material such as an oxide. Therefore, there can be obtained an all solid-state lithium ion battery having both of the high rate properties and the favorable charge-discharge cycle.

[Manufacturing Method of Lithium Ion Battery]

The lithium ion battery can be, for example, manufactured as below.

First, the positive electrode 3 that is a positive electrode pellet and the negative electrode 6 that is a negative electrode pellet are manufactured in a similar manner to the first embodiment.

Next, a solid electrolyte pellet that is the solid electrolyte layer 21 is manufactured.

First, a certain amount of the third solid electrolyte 22 is aggregated and is subjected to particle compaction. Specifically, for example, as illustrated in FIG. 13, an aggregated powder of the third solid electrolyte 22 is placed in a mold 11 or the like, and uniformly pressurized from the opening of the mold for particle compaction. In this manner, the solid electrolyte layer 21 that is a solid electrolyte pellet was finished.

The particle compaction method of the aggregate of the third solid electrolyte 22, the pressure of the particle compaction, the particle compaction time, and the like are basically not restricted, but are preferably similar to the particle compaction of the aggregate of the positive electrode particles 4 in the first embodiment, and the above described when performing particle compaction of the aggregate of the positive electrode particles 4 can be appropriately selected.

Next, these produced pellets are laminated in the order of the positive electrode pellet, the solid electrolyte pellet, and the negative electrode pellet. At this time, the contact surface between the positive electrode pellet and the solid electrolyte pellet and the contact surface between the negative electrode pellet and the solid electrolyte pellet preferably do not contain interstices. Specifically, all of the surfaces of the pellets that are in contact with other pellets are preferably planar, but not restricted to the above, and may have a shape in which the mutually contacting pellet surfaces are mutually fit without interstices. Next, the obtained pellet laminate was pressurized in the direction from the negative electrode pellet toward the positive electrode pellet to obtain a compacted powder battery.

The pressurization method of the pellet laminate is basically not restricted. However, various pressing machines described in the particle compaction of the aggregate of the positive electrode particles 4 can be appropriately selected and used.

Also, the force of pressurizing the pellet laminate is basically not restricted. However, specifically, for example, it is preferred to perform pressurization at a pressure of greater than or equal to 10 MPa and less than or equal to 400 MPa; it is more preferred to perform pressurization at a pressure of greater than or equal to 100 MPa and less than or equal to 300 MPa; and it is most preferred to perform pressurization at a pressure of greater than or equal to 150 MPa and less than or equal to 250 MPa. Also, the pressurization to the pellet laminate can be performed several times. Specifically, for example, the pellet laminate may be pressurized for the purpose of temporarily bonding and thereafter permanently bonded at the above pressures. The force of pressurizing the pellet laminate for the temporary bonding is preferably a pressure of greater than or equal to 5 MPa and less than or equal to 40 MPa, more preferably a pressure of greater than or equal to 10 MPa and less than or equal to 30 MPa, and most preferably a pressure of greater than or equal to 15 MPa and less than or equal to 25 MPa; but not restricted to the above.

Also, the particle compaction is preferably cold particle compaction. Specifically, the particle compaction is preferably performed at higher than or equal to −10° C. and lower than or equal to 100° C.; the particle compaction is more preferably performed at higher than or equal to 0° C. and lower than or equal to 50° C.; and the particle compaction is most preferably performed at higher than or equal to 10° C. and lower than or equal to 40° C.; but not restricted to the above. Also, the particle compaction may be warm particle compaction performed at a temperature condition of higher than or equal to 101° C. and lower than or equal to 300° C., or hot particle compaction performed at a temperature condition of higher than or equal to 301° C. and lower than or equal to 500° C. Also, the particle compaction is preferably performed in gas, particularly preferably performed in dry gas, and typically performed in dry atmosphere, but not restricted to the above. For example, the pressurization may be performed in a vacuum.

Also, the time required for the particle compaction is basically not restricted, but specifically, for example, preferably more than or equal to 2 minutes and less than or equal to 2 hours, more preferably more than or equal to 10 minutes and less than or equal to 1 hour, and most preferably more than or equal to 10 and less than or equal to 30 minutes, in cold particle compaction; but not restricted to the above.

Next, electrodes are manufactured on the surfaces of the positive electrode 3 and the negative electrode 6 of the obtained compacted powder battery. The electrodes can be produced by using a currently known conductive material and appropriately selecting a currently known method. An example of the conductive material includes metal. In this manner, the intended lithium ion battery was manufactured.

Also, another manufacturing method of the lithium ion battery includes sequentially laminating the aggregated powder of the positive electrode particles 4, the aggregated powder of the third solid electrolyte 22, and the aggregated powder of the negative electrode particles 7, and performing the particle compaction of this laminate. Specifically, for example, the aggregated powder of the positive electrode particles 4, the aggregated powder of the third solid electrolyte 22, and the aggregated powder of the negative electrode particles 7 are sequentially placed and laminated in a mold, and then uniformly pressurized from the opening of the mold for particle compaction.

The force of pressurizing this pellet laminate is basically not restricted. However, specifically, for example, it is preferred to perform pressurization at greater than or equal to 10 MPa; it is more preferred to perform pressurization at greater than or equal to 100 MPa; and it is most preferred to perform pressurization at greater than or equal to 200 MPa. Also, the pressurization to this laminate can be performed several times. Specifically, for example, this laminate may be pressurized for the purpose of temporarily bonding and thereafter permanently bonded at the above pressures. The force of pressurizing this laminate for the temporary bonding is preferably greater than or equal to 5 MPa, more preferably greater than or equal to 10 MPa, and most preferably greater than or equal to 25 MPa. Also, the force of pressurizing the laminate is preferably less than or equal to 1000 MPa in any case, but not restricted to the above.

Also, after laminating the aggregated powder of the positive electrode particles 4 and the aggregated powder of the third solid electrolyte 22 for particle compaction to obtain a positive electrode laminate pellet, the positive electrode laminate pellet and the negative electrode pellet may be bonded by particle compaction. Also, after laminating the aggregated powder of the negative electrode particles 7 and the aggregated powder of the third solid electrolyte 22 for particle compaction to obtain a negative electrode laminate pellet, the negative electrode laminate pellet and the positive electrode pellet may be bonded by particle compaction; but not restricted to the methods described above.

Example 3

First, there were manufactured a positive electrode pellet, that is the positive electrode 3, having a height of 0.3 mm and having a circular bottom with a diameter of 16 mm, and a negative electrode pellet, that is the negative electrode 6, having a height of 0.3 mm and having a circular bottom with a diameter of 16 mm, in a similar manner to Example 1.

Next, 0.1 g of $LiAl_3Ti_{1.7}(PO_4)_3$ particles as the third solid electrolyte 22 was provided, and placed in a cylindrical mold with a diameter of 16 mm. The particles were subjected to cold pressurization at a pressure of 20 MPa using a hand press machine. Thus, there was obtained a solid electrolyte pellet having a height of 0.3 mm and having a circular bottom with a diameter of 16 mm.

Next, the obtained pellets are laminated in the order of the positive electrode pellet, the solid electrolyte pellet, and the negative electrode pellet.

Next, this pellet laminate was placed in a cylindrical mold with a diameter of 16 mm, and subjected to cold pressurization at a pressure of 20 MPa in the direction from the negative electrode pellet toward the positive electrode pellet using a hand press machine for bonding. Thus, a compacted powder battery was obtained.

Next, this compacted powder battery was vacuum packed with a resin film, and further subjected to cold pressurization at a pressure of 200 MPa in the direction from the negative electrode pellet toward the positive electrode pellet. Thus, a compacted powder battery having a higher density was obtained.

Next, the obtained high-density compacted powder battery was taken out in the atmosphere, and gold electrodes were produced on the surfaces of the positive electrode and the negative electrode using a sputter apparatus. In this manner, an all solid-state lithium ion battery was finished.

According to the manufacturing method of the lithium ion battery of the third embodiment, while having a similar advantage to the first embodiment, the manufacture can be simplified, and drastic deterioration of the battery properties due to a change in substance of the material caused by, for example, the side reaction in the firing process is inhibited. This is because the sintering process which has been required in the existing manufacture of the all solid-state battery is not included. Furthermore, the production can be accomplished at normal temperature and under atmospheric environment; and extensive facilities are not required. Accordingly, compared to before, the manufacturing cost of the all solid-state lithium ion battery can be largely reduced, and also the battery properties of the all solid-state lithium ion battery can be significantly improved only due to the structure of the battery. Thus, even when the all solid-state lithium ion battery is manufactured by a material having a high impedance in the particle boundary, such as an oxide, an all solid-state lithium ion battery having a favorable rate properties can be obtained. Also, since the manufacture can be performed only through the particle compaction and pressurization processes, the battery can be large-sized, and also the batteries having various shapes can be manufactured.

4. Fourth Embodiment

[Lithium Ion Battery]

Next, a fourth embodiment will be described. In the fourth embodiment, as an electrode for a lithium ion battery as a secondary battery, the electrode for a lithium ion battery according to the second embodiment is used.

Figure 16:
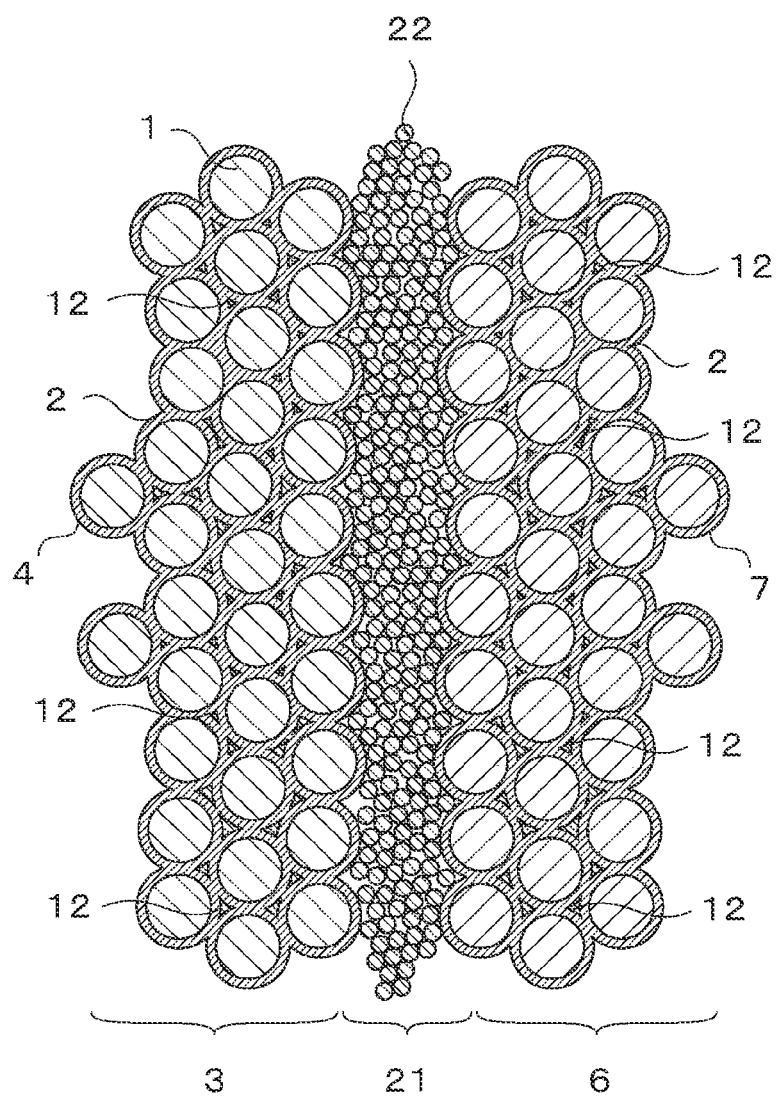
FIG. 16 is a cross-sectional view illustrating the lithium ion battery according to the fourth embodiment.

FIG. 16 is a cross-sectional view illustrating the electrode for a lithium ion battery according to the fourth embodiment.

As illustrated in FIG. 16, a lithium ion battery 20 has a structure in which a positive electrode 3 and a negative electrode 6 face each other through a solid electrolyte layer 21. As the positive electrode and the negative electrode 6, the positive electrode and the negative electrode for a lithium ion battery according to the second embodiment are used. Otherwise, the lithium ion battery according to the third embodiment is applied.

The size of the third solid electrolyte 22 may not be basically restricted, but can be appropriately selected from the sizes and the particle sizes described above as the size of the solid electrolyte 9. Particularly, in order to reduce the interstices between the solid electrolyte layer 21 and the electrode, it is preferred that the size of the third solid electrolyte 22 and the sizes of the solid electrolyte 9 and the conduction aid 10 constituting the electrode particle are substantially equal. As the size of the third solid electrolyte 22, specifically, for example, the ratio in size to the third solid electrolyte 22 is preferably mutually greater than or equal to ⅕ times and less than or equal to 5 times, more preferably greater than or equal to ½ times and less than or equal to 2 times, and most preferably greater than or equal to ⅔ times and less than or equal to 3/3 times. An example of the size in this case includes the average particle size of the primary particles. Also, in this case, the sizes of the conduction aid 10 and the electrode active substance are appropriately determined according to the above described ratio to the solid electrolyte 9, but not restricted to the above.

[Operation of Lithium Ion Battery]

Regarding the operation of this lithium ion battery, when a lithium ion enters and leaves between the positive electrode active substance 1 in the positive electrode 3 and the negative electrode active substance 5 in the negative electrode 6, the solid electrolyte 9 and the second solid electrolyte become a conduction path for the lithium ion, and the conduction aid 10 and the second conduction aid become a conduction path for an electron. Otherwise, the operation of the lithium ion battery according to the third embodiment is applied.

According to the lithium ion battery of the fourth embodiment, the positive electrode 3 and the negative electrode 6 face each other through the solid electrolyte layer 21; the positive electrode 3 and the negative electrode 6 function as the electrode for a lithium ion battery according to the second embodiment; and furthermore, the battery is an all solid-state battery. Therefore, advantages similar to the second and third embodiments are obtained. Furthermore, since the second mixed conductive layer was disposed in the space between the mutually neighboring mixed conductive layers, the thickness of the mixed conductive layer that coats the surface of the electrode active substance can be reduced, thereby to improve the conductivity. Also, since the second mixed conductive layer functions as an ion conductive path and an electron conduction path between the mutually facing mixed conductive layers, the impedance of the electrode can be further lowered, so that the rate properties of the battery can be dramatically improved.

[Manufacturing Method of Lithium Ion Battery]

The lithium ion battery can be, for example, manufactured as below.

First, the positive electrode 3 that is a positive electrode pellet and the negative electrode 6 that is a negative electrode pellet are manufactured in a similar manner to the second embodiment.

Otherwise, the manufacturing method of the lithium ion battery according to the third embodiment was applied to manufacture the intended lithium ion battery.

Example 4

First, there were manufactured a positive electrode pellet, that is the positive electrode 3, having a height of 0.3 mm and having a circular bottom with a diameter of 16 mm, and a negative electrode pellet, that is the negative electrode 6, having a height of 0.3 mm and having a circular bottom with a diameter of 16 mm, in a similar manner to Example 2. Otherwise, an all solid-state lithium ion battery was finished in a similar manner to Example 3.

Figure 17:
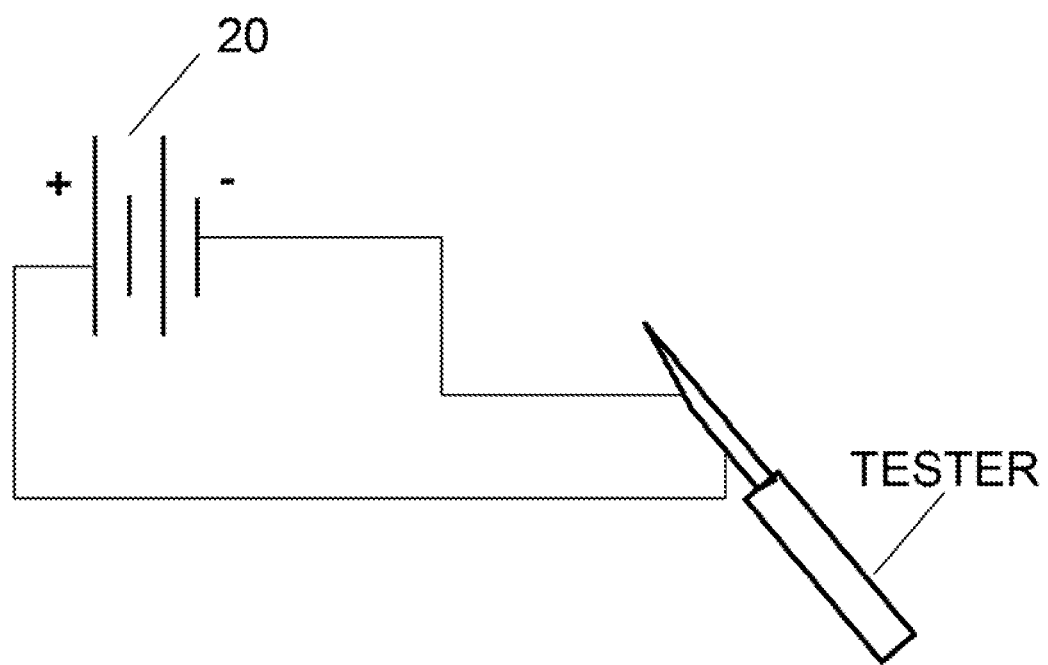
FIG. 17 is a drawing-substituting photograph illustrating a state in which the voltage between a positive electrode and a negative electrode of a lithium ion battery was measured using a tester.

FIG. 17 is a drawing-substituting photograph illustrating a state in which the obtained all solid-state lithium ion battery was sandwiched by a jig and the voltage between the positive electrode and the negative electrode was measured with a tester at room temperature (25° C.) and under atmospheric environment. As illustrated in FIG. 17, at this time, the tester indicated a voltage greater than or equal to 0.1 V.

Next, the above all solid-state lithium ion battery was charged using a potentiostat. The charging with a potentiostat was performed at a constant voltage of 3 V, and the charging time was one hour. The voltage between the positive electrode and the negative electrode of the above charged all solid-state lithium ion battery was measured with a tester at room temperature (25° C.) and under atmospheric environment. As a result, a voltage of greater than or equal to 2.0 V was observed.

Figure 18:
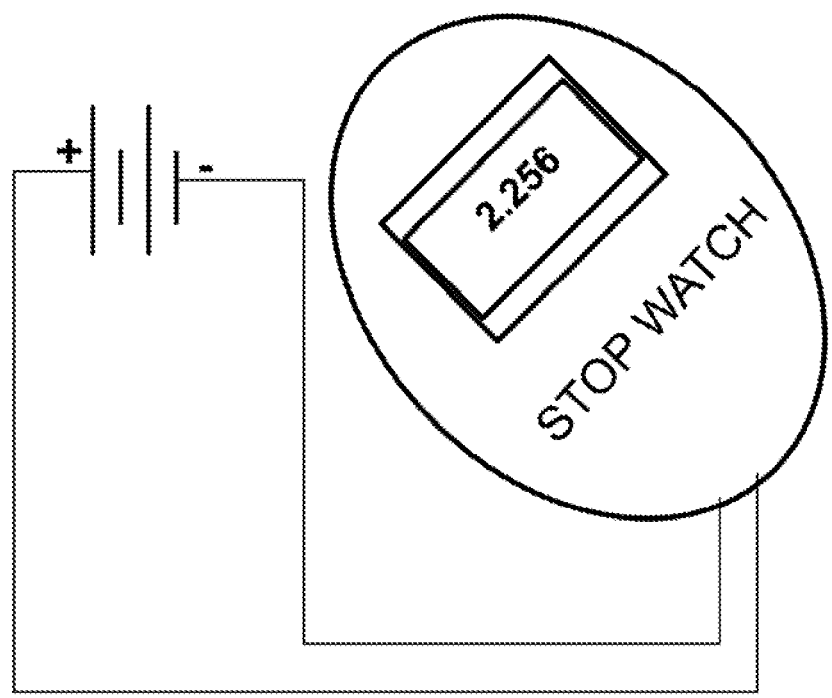
FIG. 18 is a drawing-substituting photograph illustrating a state in which a stopwatch was connected to the charged lithium ion battery.

FIG. 18 is a drawing-substituting photograph illustrating a state in which a stopwatch was connected to the above charged all solid-state lithium ion battery. As illustrated in FIG. 18, when the above charged all solid-state lithium ion battery was connected to the stopwatch, the stopwatch was able to be operated while the battery was exposed to the atmospheric environment.

In this manner, the bulk oxide solid-state battery, which had been difficult to operate, was able to be stably operated at room temperature and under the atmospheric environment. It is considered that the major reason for this is, firstly, that the formation of the mixed conductive layer on the surface of the electrode active substance, which had been difficult only by the existing precise mixing, became stably possible in the present technology. Also, it is secondly considered that since the strong coating of the surface of the electrode active substance with the mixed conductive layer enabled an unnecessary chemical reaction to be blocked without damaging the electrochemical properties of the electrode active substance, the chemical stability in the atmosphere improved.

Also, in order to find the operating temperature range of the present produced battery, the produced battery was fired in an electric furnace with the electrode attached thereto. As a result, the battery voltage was still able to be observed. Thus, it became apparent that the battery properties are stable even under the high temperature environment.

As described above, according to the manufacturing method of the lithium ion battery of the fourth embodiment, while having the advantages similar to the second and third embodiments, the novel lithium ion battery obtained by this manufacturing method can be stably operated even at room temperature and in the atmosphere. Also, since the electric resistance in the whole battery is smaller than the existing all solid-state lithium ion battery, the rate properties are high. Furthermore, since the bond between the electrode active substance and the mixed conductive layer in the electrode is stable, the charge-discharge cycle properties can also be improved.

Although the embodiments and the Examples of the present disclosure have been specifically described, the present technology is not restricted to the above embodiments and Examples, and various modifications are possible.

For example, the numerals, the structures, the configurations, the shapes and the materials described in the above embodiments and Examples are only examples, and numerals, structures, configurations, shapes and materials other than the above may be used depending on necessity.

Additionally, the present technology may also be configured as below.

(1) A secondary battery including:
a positive electrode;
a negative electrode; and
a solid electrolyte layer disposed between the positive electrode and the negative electrode,
wherein at least one of the positive electrode and the negative electrode contains a granular solid electrolyte and a granular conduction aid both bonded to a surface of a granular electrode active substance.

(2) The secondary battery according to (1),
wherein the solid electrolyte and the conduction aid bonded to the surface of the electrode active substance form a continuous film on at least a portion of the surface of the electrode active substance.

(3) The secondary battery according to (1) or (2),
wherein at least one of the positive electrode and the negative electrode is an aggregate of electrode particles each having a mixed conductive layer on the surface of the electrode active substance, the mixed conductive layer including a mixture of the granular solid electrolyte and the granular conduction aid.

(4) The secondary battery according to any one of (1) to (3),
wherein the aggregate of electrode particles is configured such that at least some of the mixed conductive layers constituting the electrode particles are in contact with each other.

(5) The secondary battery according to any one of (1) to (4),
wherein the mixed conductive layer including the mixture of the granular solid electrolyte and the granular conduction aid is disposed in at least a portion of a space between the mutually neighboring electrode particles.

(6) The secondary battery according to any one of (1) to (5),
wherein the solid electrolyte and the conduction aid both bonded to the surface of the electrode active substance each have a particle size of less than a particle size of the electrode active substance.

(7) The secondary battery according to any one of (1) to (6),
wherein the conduction aid includes at least one selected from the group consisting of metal, carbon, and a conductive polymer.

(8) The secondary battery according to any one of (1) to (7), wherein the solid electrolyte includes at least one selected from the group consisting of an oxide, a phosphoric acid-based compound, a germanic acid-based compound, a sulfide, and a nitride.

(9) The secondary battery according to any one of (1) to (8), wherein the electrode active substance includes a substance containing at least one element selected from the group of C, Li, Mg, Mn, Fe, Co, Ni, B, Al, Ti, Si, Ge, Sn, Bi, and W.

(10) The secondary battery according to any one of (1) to (9), wherein the electrode particle contains the solid electrolyte at a ratio of greater than or equal to 3% by weight and less than or equal to 15% by weight.

(11) The secondary battery according to any one of (1) to (10), wherein the electrode particle contains the conduction aid at a ratio of greater than or equal to 3% by weight and less than or equal to 20% by weight.

(12) A manufacturing method of a secondary battery, including the steps of:

forming at least one of a positive electrode and a negative electrode, using a plurality of electrode particles each including a granular solid electrolyte and a granular conduction aid both bonded on a surface of a granular electrode active substance; and laminating the positive electrode and the negative electrode with a solid electrolyte layer interposed therebetween.

(13) The manufacturing method of a secondary battery according to claim (12), further including the step of:

forming a mixed conductive layer on the surface of the electrode active substance to form an electrode particle, the mixed conductive layer including a mixture of the solid electrolyte and the conduction aid.

(14) The manufacturing method of a secondary battery according to (12) or (13), further including the steps of:

coating the surface of the electrode active substance with the mixed conductive layer containing the mixture of the solid electrolyte and the conduction aid to form an electrode particle; and forming at least one of the positive electrode and the negative electrode using an aggregate of the electrode particles.

(15) The manufacturing method of a secondary battery according to any one of (12) to (14), wherein the solid electrolyte and the conduction aid both bonded to the surface of the electrode active substance each have a particle size of less than a particle size of the electrode active substance.

(16) The manufacturing method of a secondary battery according to any one of (12) to (15), wherein the electrode particle contains the solid electrolyte at a ratio of greater than or equal to 3% by weight and less than or equal to 15% by weight.

(17) The manufacturing method of a secondary battery according to any one of (12) to (16), wherein the electrode particle contains the conduction aid at a ratio of greater than or equal to 3% by weight and less than or equal to 20% by weight.

(18) An electrode for a secondary battery, wherein a granular solid electrolyte and a granular conduction aid are bonded to a surface of a granular electrode active substance.

(19) An electronic device having a secondary battery, the secondary battery including:

a positive electrode;

a negative electrode; and a solid electrolyte layer disposed between the positive electrode and the negative electrode, wherein at least one of the positive electrode and the negative electrode contains a granular solid electrolyte and a granular conduction aid both bonded to a surface of a granular electrode active substance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 positive electrode active substance
2 mixed conductive layer
3 positive electrode for a lithium ion battery
4 positive electrode
5 negative electrode active substance
6 negative electrode for a lithium ion battery
7 negative electrode particle
8 void
9 solid electrolyte
10 conduction aid
11 mold
12 second mixed conductive layer
13 second solid electrolyte
14 second conduction aid
20 lithium ion battery
21 solid electrolyte layer
22 third solid electrolyte

The invention claimed is:

1. A secondary battery, comprising:

a positive electrode comprising a first aggregate of positive electrode particles;

a negative electrode comprising a second aggregate of negative electrode particles; and a solid electrolyte layer between the first aggregate of the positive electrode particles and the second aggregate of the negative electrode particles, wherein the solid electrolyte layer is in contact with a portion of the first aggregate of the positive electrode particles and in contact with a portion of the second aggregate of the negative electrode particles, wherein each of the positive electrode particles and the negative electrode particles contains a granular electrode active substance and a mixed conductive layer, and wherein the mixed conductive layer includes a mixture of a granular solid electrolyte and a granular conduction aid, and the mixed conductive layer is on a surface of the granular electrode active substance.

2. The secondary battery according to claim 1, wherein the granular solid electrolyte and the granular conduction aid are bonded to the surface of the granular electrode active substance to cover at least a portion of the surface of the granular electrode active substance.

3. The secondary battery according to claim 1,
wherein the first aggregate of the positive electrode particles includes a first positive electrode particle and at least one second positive electrode particle,
wherein a first mixed conductive layer of the first positive electrode particle is in contact with a second mixed conductive layer of the at least one second positive electrode particle.

4. The secondary battery according to claim 3,
wherein the mixed conductive layer that includes the mixture of the granular solid electrolyte and the granular conduction aid is present in at least a portion of a space between neighboring electrode particles of the first aggregate of the positive electrode particles.

5. The secondary battery according to claim 1,
wherein each of the granular solid electrolyte and the granular conduction aid has a particle size of less than a particle size of the granular electrode active substance.

6. The secondary battery according to claim 1,
wherein the granular conduction aid includes at least one selected from the group consisting of metal, carbon, and a conductive polymer.

7. The secondary battery according to claim 1,
wherein the solid electrolyte layer includes at least one selected from the group consisting of an oxide, a phosphoric acid-based compound, a germanic acid-based compound, a sulfide, and a nitride.

8. The secondary battery according to claim 1,
wherein the granular electrode active substance includes a substance containing at least one element selected from the group consisting of C, Li, Mg, Mn, Fe, Co, Ni, B, Al, Ti, Si, Ge, Sn, Bi, and W.

9. The secondary battery according to claim 1,
wherein the positive electrode particles or the negative electrode particles contains the granular solid electrolyte at a ratio of greater than or equal to 3% by weight and less than or equal to 15% by weight.

10. The secondary battery according to claim 1,
wherein the mixed conductive layer is configured to cover the surface of the granular electrode active substance with a coverage of greater than or equal to 90% of the surface of the granular electrode active substance.

* * * * *